United States Patent
Kim et al.

(10) Patent No.: US 11,308,936 B2
(45) Date of Patent: Apr. 19, 2022

(54) SPEECH SIGNAL PROCESSING METHOD AND SPEECH SIGNAL PROCESSING APPARATUS

(71) Applicant: SAMSUNG ELECTRONICS CO., LTD., Suwon-si (KR)

(72) Inventors: Tae-yoon Kim, Seoul (KR); Sang-ha Kim, Seoul (KR); Sung-Soo Kim, Bucheon-si (KR); Jin-sik Lee, Suwon-si (KR); Chang-woo Han, Seoul (KR); Eun-kyoung Kim, Suwon-si (KR); Jae-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 16/399,211

(22) Filed: Apr. 30, 2019

(65) Prior Publication Data

US 2019/0259376 A1 Aug. 22, 2019

Related U.S. Application Data

(62) Division of application No. 14/936,043, filed on Nov. 9, 2015, now Pat. No. 10,319,367.
(Continued)

(30) Foreign Application Priority Data

Oct. 30, 2015 (KR) ........................ 10-2015-0152525

(51) Int. Cl.
  *G10L 15/06* (2013.01)
  *G10L 15/30* (2013.01)
  *G10L 15/04* (2013.01)

(52) U.S. Cl.
  CPC ............ *G10L 15/063* (2013.01); *G10L 15/04* (2013.01); *G10L 15/30* (2013.01); *G10L 2015/0635* (2013.01)

(58) Field of Classification Search
  CPC ....... G10L 15/063; G10L 15/04; G10L 15/30; G10L 2015/0635
  (Continued)

(56) References Cited

U.S. PATENT DOCUMENTS 8,166,104 B2   4/2012   Shein et al.
9,047,868 B1   6/2015   O'Neill et al.
(Continued)

FOREIGN PATENT DOCUMENTS

CN   102349068 A   2/2012
CN   102541505 A   7/2012
(Continued)

OTHER PUBLICATIONS

Communication dated Feb. 19, 2016, from the European Patent Office in counterpart European Application No. 15193742.2.
(Continued)

*Primary Examiner* — Thierry L Pham
(74) *Attorney, Agent, or Firm* — Sughrue Mion, PLLC

(57) ABSTRACT

A speech signal processing method of a user terminal includes: receiving a speech signal, detecting a personalized information section including personal information in the speech signal, performing data processing on the personalized information section of the speech signal by using a personalized model generated based on the personal information, and receiving, from a server, a result of the data processing performed by the server on a general information section of the speech signal that is different than the personalized information section of the speech signal.

13 Claims, 23 Drawing Sheets

Related U.S. Application Data

(60) Provisional application No. 62/076,717, filed on Nov. 7, 2014.

(58) Field of Classification Search
    USPC ............... 704/206, 221, 243, 244, 250, 266
    See application file for complete search history.

(56) References Cited

U.S. PATENT DOCUMENTS

| | | |
|---|---|---|
| 2006/0293898 A1 | 12/2006 | Ollason |
| 2010/0122083 A1* | 5/2010 | Gim ..................... H04L 9/083 713/162 |
| 2012/0215528 A1 | 8/2012 | Nagatomo |
| 2013/0085753 A1 | 4/2013 | Bringert et al. |
| 2013/0144618 A1 | 6/2013 | Sun et al. |
| 2013/0346078 A1 | 12/2013 | Gruenstein et al. |
| 2014/0143550 A1 | 5/2014 | Ganong, III et al. |
| 2014/0207442 A1* | 7/2014 | Ganong, III ............ G10L 15/30 704/201 |
| 2014/0278426 A1 | 9/2014 | Jost et al. |

FOREIGN PATENT DOCUMENTS

| | | |
|---|---|---|
| CN | 103021403 A | 4/2013 |
| CN | 103137129 A | 6/2013 |
| CN | 103295575 A | 9/2013 |
| CN | 103488785 A | 1/2014 |
| KR | 10-1330328 B1 | 11/2013 |
| WO | 01/59760 A1 | 8/2001 |

OTHER PUBLICATIONS

Communication dated Apr. 7, 2016, from the European Patent Office in counterpart European Application No. 15193742.2.
Communication dated Oct. 8, 2019, issued by the State Intellectual Property Office of People's Republic of China in counterpart Chinese Application No. 201510756263.X.
Communication dated Jul. 29, 2020 issued by the European Patent Office in counterpart European Application No. 20161030.0.
Communication dated Dec. 23, 2021 by the Korean Intellectual Property Office for Korean Patent Application No. 10-2015-0152525.

* cited by examiner

FIG. 18

| PERSONAL INFORMATION | 1272 |
|---|---|
| CONTACT | Hong Gil-dong<br>Kim Gil-dong<br>... |
| MUSIC | Gangnam Style<br>Toxic<br>Psy<br>... |
| SEARCH RESULT | Galaxy<br>Note5<br>... |
| ... | ... |

FIG. 19

| WORD MAPPING TABLE 1910 ||
|---|---|
| WORD | ID |
| Hong Gil-dong | 0x01 |
| Kim Gil-dong | 0x02 |
| Gangnam Style | 0x03 |
| TOXIC | 0x04 |
| Psy | 0x05 |
| Galaxy | 0x06 |
| Note | 0x07 |
| ... | ... |

FIG. 20

| PHONETIC DICTIONARY | |
|---|---|
| WORD | PHONETIC SYMBOL |
| Hong Gil-dong | HH OW NX K IY T OW NX |
| Kim Gil-dong | K IY M K IY L T OW NX |
| Gangnam Style | K AA NX N A M ST AI L |
| TOXIC | t ɑː k s ɪ k |
| Psy | s a l |
| Galaxy | g æ l ə k s i |
| Note | N ɔ t |
| ... | ... |

| ACOUSTIC UNIT MAPPING TABLE | 2110 |
|---|---|
| PHONETIC SYMBOL | ID |
| HH | 0x101 |
| OW | 0x102 |
| NX | 0x103 |
| K | 0x104 |
| IY | 0x105 |
| L | 0x106 |
| ... | ... |

FIG. 22

| PERSONAL INFORMATION | WORD ID | ACOUSTIC UNIT ID |
|---|---|---|
| HONG Gil-dong | 0x01 | 0x101<br>0x102<br>0x103<br>0x104<br>0x105<br>0x106<br>... |
| KIM Gil-dong | 0x02 | 0x130<br>0x133<br>0x137<br>0x104<br>0x105<br>0x106<br>... |
| ... | ... | ... |

SPEECH SIGNAL PROCESSING METHOD AND SPEECH SIGNAL PROCESSING APPARATUS

CROSS-REFERENCE TO RELATED APPLICATIONS

This application is a Divisional of U.S. application Ser. No. 14/936,043, filed Nov. 9, 2015, which claims the benefit of U.S. Provisional Application No. 62/076,717, filed on Nov. 7, 2014 in the U.S. Patent Office and Korean Patent Application No. 10-2015-0152525, filed on Oct. 30, 2015 in the Korean Intellectual Property Office, the disclosures of which are incorporated herein in their entireties by reference.

BACKGROUND

1. Field

Methods and apparatuses consistent with exemplary embodiments relate to speech signal processing, and more particularly, to speech signal processing methods and speech signal processing apparatuses, which are capable of protecting personal information while using a personalized model.

2. Description of the Related Art

Speech recognition (SR) is a technology for converting a user's speech into a text. Since such a process is automatically performed, the speech recognition is also referred to as automatic speech recognition (ASR). In smartphones or televisions (TVs), the speech recognition is widely used as an interface technology for replacing a keyboard input. Natural language understanding (NLU) is a technology that extracts the meaning of a user's speech from a recognition result of the speech recognition. Instead of simply recognizing the user's speech, the meaning of the user's speech may be determined more accurately by performing higher level analysis of the user's speech.

An ASR/NLU system may be divided into two modules, that is, a client that receives a speech signal and an ASR/NLU engine that performs ASR and NLU on the speech signal. In order to increase speech signal processing speed, the two modules may be designed to be separate from each other. In this case, a device, such as a smartphone or a TV, which has limitations in processing capacity and data storage capacity, may be configured as a client, and the ASR/NLU engine may be configured in an independent server form having high arithmetic capacity. These two modules may be connected to each other via a network. The device is located at a position close to a user and serves to receive a speech signal. The server having a high data processing speed serves to perform ASR and NLU. As another configuration, an ASR/NLU engine may be mounted inside the device as well as the server, so that the two ASR/NLU engines perform ASR and NLU in cooperation with each other.

One of the methods of increasing the performance of the ASR/NLU system is to collect data for each user and generate a model for each user. Such a model for each user is referred to as a personalized model, and such a method is referred to as a personalized modeling. Since the personalized model is enabled to generate a module customized for a specific individual, the personalized model usually has a higher performance than a general model generated for many unspecified persons. However, in the case of the personalized modeling, it is necessary to use a user's personal information so as to generate the personalized model. A problem of information protection may occur in a process of transmitting and processing personal information. When an encryption technology is applied for solving this problem, a processing speed may be reduced.

SUMMARY OF THE INVENTION

Exemplary embodiments of the present invention overcome the above disadvantages and other disadvantages not described above. Also, exemplary embodiments are not required to overcome the disadvantages described above, and an exemplary embodiment of the present invention may not overcome any of the problems described above.

One or more exemplary embodiments provide speech signal processing methods and speech signal processing apparatuses, which are capable of protecting personal information while using a personalized model.

One or more exemplary embodiments also provide speech signal processing methods and speech signal processing apparatuses, in which a personalized information section and a general information section are separately processed in a user terminal and a server.

One or more exemplary embodiments also provide speech signal processing methods and speech signal processing apparatuses, in which a speech signal having processed by a server is processed again by using a personalized model.

One or more exemplary embodiments also provide speech signal processing methods and speech signal processing apparatuses, which use an ID-based personalized model.

According to an aspect of an exemplary embodiment, there is provided a speech signal processing method of a user terminal, the speech signal processing method including: receiving a speech signal, detecting a personalized information section including personal information in the speech signal, performing data processing on the personalized information section of the speech signal by using a personalized model generated based on the personal information, and receiving, from a server, a result of the data processing performed by the server on a general information section of the speech signal that is different than the personalized information section of the speech signal.

The speech signal processing method may further include generating speech section information about the personalized information section and the general information section and transmitting the speech section information to the server.

The speech section information may include section marking information that marks a location of at least one of the personalized information section and the general information section in the speech signal.

The speech signal processing method may further include receiving speech section information about the personalized information section and the general information section from the server.

The result of the data processing performed on the general information section of the speech signal, which is received from the server, may include a result of the data processing performed on the general information section of the speech signal by the server using a general model.

According to an aspect of another exemplary embodiment, there is provided a speech signal processing method of a server, the speech signal processing method including: receiving a speech signal; detecting a personalized information section including personal information in the speech signal; performing data processing on a general information section of the speech signal that is different than the personalized information section of the speech signal, by using a general model; and transmitting, to a user terminal, a result of the data processing performed on the general information section of the speech signal.

The speech signal processing method may further include generating speech section information about the personalized information section and the general information section and transmitting the speech section information to the user terminal.

The speech section information may include section marking information that marks a location of at least one of the personalized information section and the general information section in the speech signal.

The speech signal processing method may further include receiving speech section information about the personalized information section and the general information section from the user terminal.

According to an aspect of another exemplary embodiment, there is provided a speech signal processing method of a user terminal, the speech signal processing method including: receiving a speech signal; receiving, from a server, a result of data processing performed on the speech signal by the server using a general model; and performing data processing on the speech signal by using the result of the data processing and a personalized model generated based on personal information.

The performing of the data processing on the speech signal by using the result of the data processing and the personalized model generated based on personal information may include performing data processing on a personalized information section including the personal information of the speech signal.

The speech signal processing method may further include detecting the personalized information section in the speech signal.

The speech signal processing method may further include receiving speech section information about the personalized information section and a general information section from the server.

The speech section information may include section marking information that marks a location of at least one of the personalized information section and the general information section in the speech signal.

The personalized model may include at least one of a personalized speech recognition (SR) model, a personalized natural language understanding (NLU) model, and a personalized lexical model.

According to an aspect of another exemplary embodiment, there is provided a speech signal processing method of a user terminal, the speech signal processing method including: generating a mapping table by mapping an identification (ID) to personal information; generating an ID-based personalized model by using the mapping table; transmitting the ID-based personalized model to a server; receiving, from a server, a result of data processing performed on the speech signal by using the ID-based personalized model; and restoring the personal information corresponding to the ID by using the result of the data processing and the mapping table.

The generating of the ID-based personalized model by using the mapping table may include representing the ID mapped to the personal information by using an acoustic unit ID that is an ID mapped to an acoustic unit.

The acoustic unit ID may include an ID mapped to the acoustic unit according to prearrangement with the server.

The speech signal processing method may further include generating the mapping table by mapping an ID to additional information generated from the personal information.

According to an aspect of another exemplary embodiment, there is provided a speech signal processing method of a server, the speech signal processing method including: receiving an ID-based personalized model from a user terminal; receiving a speech signal; performing data processing on the speech signal by using the ID-based personalized model; and transmitting a result of the data processing to the user terminal.

The performing of the data processing on the speech signal by using the ID-based personalized model may include representing an ID mapped to the personal information by using an acoustic unit ID that is an ID mapped to an acoustic unit according to prearrangement with the user terminal.

According to an aspect of another exemplary embodiment, there is provided a user terminal including: a receiver configured to receive a speech signal; a communication interface configured to communicate with a server; and a controller configured to detect a personalized information section including personal information in the speech signal, and perform data processing on the personalized information section of the speech signal by using a personalized model generated based on the personal information, wherein the communication interface is further configured to receive, from the server, a result of data processing performed by the server on a general information section of the speech signal that is different than the personalized information section of the speech signal.

The controller may be configured to generate speech section information about the personalized information section and the general information section and transmit the speech section information to the server.

The speech section information may include section marking information that marks a location of at least one of the personalized information section and the general information section in the speech signal.

The communication interface may be configured to receive speech section information about the personalized information section and the general information section from the server.

The result of the data processing performed on the speech signal corresponding to the general information section, which is received from the server, may include a result of the data processing performed on the speech signal corresponding to the general information section by the server using the general model.

According to an aspect of another exemplary embodiment, there is provided a server including: a receiver configured to receive a speech signal; a communication interface configured to communicate with a user terminal; and a controller is configured to detect a personalized information section including personal information in the speech signal, perform data processing on a general information section of the speech signal that is different than the personalized information section of the speech signal, by using a general model, and control the communication interface to transmit a result of data processing performed on the general information section of the speech signal to the user terminal.

The controller may be configured to generate speech section information about the personalized information section and the general information section and control the communication interface to transmit the speech section information to the user terminal.

The speech section information may include section marking information that marks a location of at least one of the personalized information section and the general information section in the speech signal.

The communication interface may be configured to receive speech section information about the personalized information section and the general information section from the user terminal.

According to an aspect of another exemplary embodiment, there is provided a user terminal including: a communication interface configured to receive, from a server, a result of data processing performed on a speech signal by the server using a general model; and a controller configured to perform data processing on the speech signal by using a personalized model generated based on the result of the data processing received from the server and personal information.

The controller may be configured to perform data processing on a personalized information section including the personal information in the speech signal by using the personalized model generated based on the result of the data processing received from the server and the personal information.

The controller may be configured to detect the personalized information section in the speech signal.

The communication interface may be configured to receive speech section information about the personalized information section and the general information section from the server.

The speech section information may include section marking information that marks a location of at least one of the personalized information section and the general information section in the speech signal.

The personalized model may include at least one of a personalized SR model, a personalized NLU model, and a personalized lexical model.

According to an aspect of another exemplary embodiment, there is provided a user terminal including: a receiver configured to receive a speech signal; a communication interface configured to communicate with a server; and a controller configured to generate a mapping table by associating personal information with an identification (ID), generate an ID-based personalized model by using the mapping table, control the communication interface to transmit the ID-based personalized model is transmitted to the server, control the receiver to receive a result of data processing performed on the speech signal by using the ID-based personalized model from the server, and restore the personal information corresponding to the ID by using the result of the data processing and the mapping table.

The controller may be configured to generate the ID-based personalized model by using the mapping table such that an ID mapped to the personal information is represented by an acoustic unit ID that is an ID mapped to an acoustic unit.

The acoustic unit ID may include an ID mapped to the acoustic unit according to prearrangement with the server.

The controller may be configured to generate the mapping table by mapping an ID to additional information generated from the personal information.

According to an aspect of another exemplary embodiment, there is provided a server including: a receiver configured to receive a speech signal; a communication interface configured to receive an identification (ID)-based personalized model from a user terminal; and a controller configured to perform data processing on the speech signal by using the ID-based personalized model, and control the communication interface to transmit a result of the data processing to the user terminal.

The controller may be configured to perform the data processing on the speech signal by using the ID-based personalized model such that an ID mapped to personal information is represented by using an acoustic unit ID that is an ID mapped to an acoustic unit according to prearrangement with the user terminal.

BRIEF DESCRIPTION OF THE DRAWINGS

The above and/or other aspects will become apparent and more readily appreciated from the following description of exemplary embodiments, taken in conjunction with the accompanying drawings in which:

FIG. 18 is a diagram for describing personal information;

FIG. 19 is a diagram for describing a word mapping table in which personal information is mapped to IDs;

FIG. 20 is a diagram for describing a phonetic dictionary in which personal information is mapped to phonetic symbols;

FIG. 21 is a diagram for describing an acoustic unit mapping table in which phonetic symbols of personal information are mapped to IDs;

FIG. 22 is a diagram for describing personal information that is mapped to word IDs and acoustic unit IDs.

DETAILED DESCRIPTION OF THE INVENTION

Figure 1:
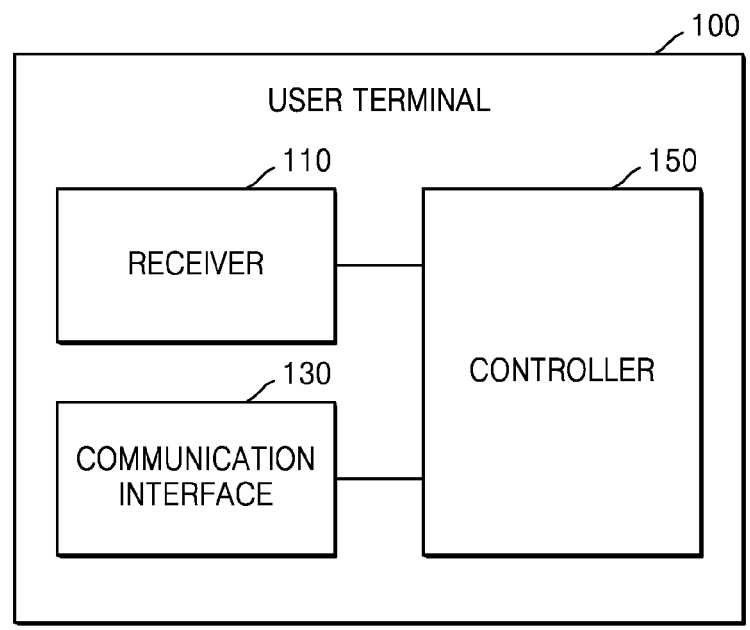
FIG. 1 is a block diagram illustrating an internal configuration of a user terminal according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of" when preceding a list of elements, modify the entire list of elements and do not modify the individual elements of the list.

It will be understood that when an element is referred to as being "connected to" or "coupled to" another element, it may be directly connected or coupled to the other element or intervening elements may be present. It will be further understood that the terms "comprises" and/or "comprising," when used in this specification, specify the presence of stated elements, but do not preclude the presence or addition of one or more other elements. As used herein, the term "unit" refers to a software component or a hardware component such as FPGA or ASIC, and the "unit" performs certain tasks. However, the "unit" should not be construed as being limited to software or hardware. The "unit" may be configured to reside on an addressable storage medium and be configured to execute one or more processors. Therefore, the "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and units or be further separated into additional components and "units".

Hereinafter, exemplary embodiments will be described with reference to the accompanying drawings in such a manner that they may easily be carried out by a person with ordinary skill in the art to which the present invention pertains. For clarity of description, certain components not pertinent to the exemplary embodiments are omitted.

The terms used in this specification are those general terms currently widely used in the art in consideration of functions in regard to the inventive concept, but the terms may vary according to the intention of those of ordinary skill in the art, precedents, or new technology in the art. In addition, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

In the present disclosure, a personalized information section may mean a section of a speech signal which includes personal information capable of identifying each individual directly or indirectly. For example, a section of a speech signal which includes a name stored in a phone book of a user terminal, a user's search history, or user location information may correspond to the personalized information section.

In the present disclosure, a general information section may mean the other section of the speech signal which is a section of the speech signal except for the personalized information section, which includes general information other than the personal information. For example, a section including a sentence having a general meaning, such as "call me" or "did you eat?" may correspond to the general information section.

In the present disclosure, a personalized model may be a speech processing model to which individual characteristics are reflected and may be a speech processing model customized for a specific individual.

In the present disclosure, a general model may be a general speech processing model and may be a speech processing model for processing speeches of many and unspecified persons instead of a specific individual.

FIG. 1 is a block diagram illustrating an internal configuration of a user terminal 100 according to an exemplary embodiment.

Referring to FIG. 1, the user terminal 100 according to the present exemplary embodiment may include a receiver 110, a communication interface 130, and a controller 150.

The receiver 110 may receive a speech signal. The receiver 110 may include various elements, such as a microphone, a universal serial bus (USB) interface, or a digital versatile disk (DVD) interface. For example, when the receiver 110 includes the microphone, the user terminal 100 may directly receive a user speech signal through the microphone. When the receiver 110 includes the USB interface, the user terminal 100 may receive a speech signal file from a USB. In addition, when a speech signal is received from an external device through the communication interface 130, the communication interface 130 may perform the function of the receiver 110.

The communication interface 130 may communicate with the external device. The communication interface 130 may be connected to a network by wire or wireless and communicate with the external device. According to the present exemplary embodiment, the communication interface 130 may communicate with a server and transmit data to and receive data from the server. For example, the communication interface 130 may include a short-range communication module, a mobile communication module, a wireless Internet module, and a wired Internet module. In addition, the communication interface 130 may include one or more elements.

The controller 150 may control an overall operation of the user terminal 100 and process a speech signal by controlling the receiver 110 and the communication interface 130. The controller 150 may include a random access memory (RAM) configured to store a signal or data input from the outside of the user terminal 100 or used as storage regions corresponding to various operations performed in an electronic device, a read-only memory (ROM) configured to store a control program for controlling peripheral devices, and a processor. The processor may be implemented by a system on chip (SoC) in which a core (not illustrated) and a graphic processing unit (GPU) (not illustrated) are integrated. In addition, the processor may include a plurality of processors.

The controller 150 according to the present exemplary embodiment may perform control such that a speech signal is received through the receiver 110, a personalized information section including personal information is detected in the received speech signal, data processing is performed on the speech signal corresponding to the personalized information section by using a personalized model generated based on the personal information, and a result of data processing on the speech signal corresponding to the general information section, that is, the other section which is a section of the speech signal except for the personalized information section, is received from the server through the communication interface 130. At this time, the result of the data processing performed on the speech signal corresponding to the general information section, which is received from the server, may be a result of the data processing performed on speech signal corresponding to the general information section by the server using the general model. Since the server has a high arithmetic capacity, it is possible to perform quick data processing in the general information section.

In addition, the controller 150 may perform control such that speech section information about the personalized information section and the general information section is generated and transmitted to the server through the communication interface 130, or speech section information about the personalized information section and the general information section is received from the server. The speech section information may include section marking information that marks a location of at least one of the personalized information section and the general information section in the speech signal.

Furthermore, the controller 150 may perform control such that a speech processing result is output to the user.

According to the present exemplary embodiment, the user terminal 100 may perform data processing on the speech signal corresponding to the personalized information section by using the personalized model generated based on the personal information, and receive the data processing result from the server with respect to the speech signal corresponding to the general information section, that is, the other section which is a section of the speech signal except for the personalized information section. Since the server performs the data processing on only the general information section, the personalized model is not used during the data processing. Therefore, any type of information, including the personal information, is not transmitted between the server and the user terminal 100, and personal information is not stored in the server. Consequently, according to the present exemplary embodiment, it is possible to implement a speech processing system having a higher performance and a higher processing speed while fundamentally protecting the personal information.

According to another exemplary embodiment, the controller 150 may perform control such that a speech signal is received through the receiver, a result of data processing on the speech signal by using the general model is received from the server through the communication interface 130, and data processing is performed on the speech signal by using the personalized model generated based on the result of the data processing and the personal information. In this case, since the server has a high arithmetic capacity, it is possible to perform quick data processing in the general information section. In addition, the personalized model may be at least one of a personalized SR model, a personalized NLU model, and a personalized lexical model.

In addition, the controller 150 may perform control such that data processing is performed on the speech signal corresponding to the personalized information section including the personal information when the data processing is performed on the speech signal by using the personalized model generated based on the result of the data processing and the personal information. At this time, the controller may perform control such that the personalized information section is detected in the speech signal and may perform control such that the speech section information about the personalized information section and the general information section is received from the server through the communication interface 130. The speech section information may include section marking information that marks a location of at least one of the personalized information section and the general information section in the speech signal.

According to the present exemplary embodiment, the user terminal 100 may receive, from the server, the result of the data processing performed on the speech signal by using the general model and perform data processing again on the received speech signal by using the personalized model generated based on the result of the data processing and the personal information. That is, since the speech processing using the personalized modeling is performed by only the user terminal 100, any type of information, including the personal information, is not transmitted between the server and the user terminal 100, and any personal information is not stored in the server. Consequently, according to the present exemplary embodiment, it is possible to implement a speech processing system having a higher performance and a higher processing speed while fundamentally protecting the personal information.

Figure 2:
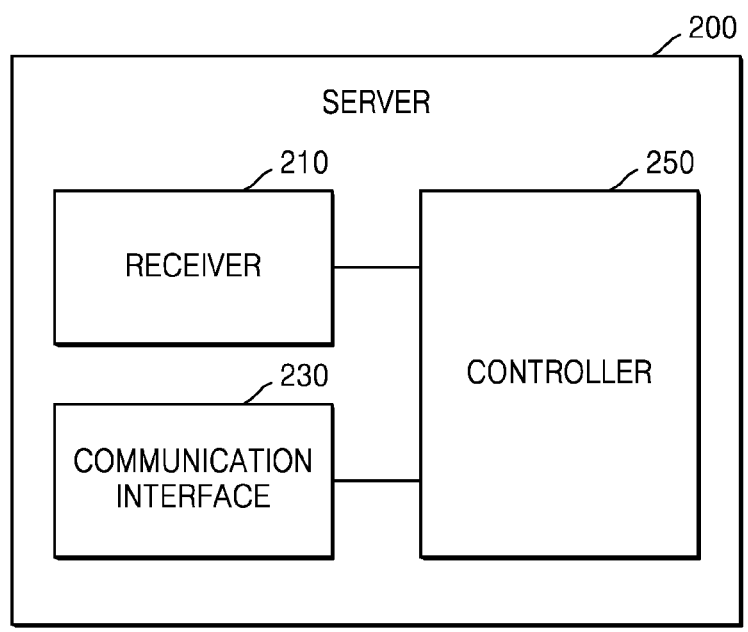
FIG. 2 is a block diagram illustrating an internal configuration of a server according to an exemplary embodiment.

FIG. 2 is a block diagram illustrating an internal configuration of a server 200 according to an exemplary embodiment.

Referring to FIG. 2, the server 200 according to the present exemplary embodiment may include a receiver 210, a communication interface 230, and a controller 250.

The receiver 210 may receive a speech signal. The receiver 210 may include elements, such as a USB interface and a DVD interface, which are capable of receiving speech signals having various formats. For example, when the receiver 210 includes the USB interface, the server 200 may receive a speech signal file from a USB. In addition, when a speech signal is received from an external device through the communication interface 230, the communication interface 230 may perform the function of the receiver 210.

The communication interface 230 may communicate with the external device. The communication interface 230 may be connected to a network by wire or wireless and communicate with the external device. According to the present exemplary embodiment, the communication interface 230 may communicate with the user terminal (100 of FIG. 1) and transmit/receive data to/from the user terminal (100 of FIG. 1). According to the present exemplary embodiment, the communication interface 230 may communicate with the user terminal (100 of FIG. 1) and transmit/receive data to/from the user terminal (100 of FIG. 1). For example, the communication interface 230 may include a short-range communication module, a mobile communication module, a wireless Internet module, and a wired Internet module. In addition, the communication interface 230 may include one or more elements.

The controller 250 may control an overall operation of the server 200 and process a speech signal by controlling the receiver 210 and the communication interface 230. The controller 250 may include a RAM configured to store a signal or data input from the outside of the server 200 or used as storage regions corresponding to various operations performed in an electronic device, a ROM configured to store a control program for controlling peripheral devices, and a processor. The processor may be implemented by an SoC in which a core (not illustrated) and a GPU (not illustrated) are integrated. In addition, the processor may include a plurality of processors.

The controller 250 according to the present exemplary embodiment may perform control such that a speech signal is received through the receiver 210, a personalized information section including personal information is detected in the received speech signal, data processing is performed on the speech signal corresponding to a general information section which is a section of the speech signal except for the personalized information section, by using a general model, and a result of data processing on the speech signal corresponding to the general information section is transmitted to the user terminal (100 of FIG. 1) through the communication interface 230.

In addition, the controller 250 may perform control such that speech section information about the personalized information section and the general information section is generated and transmitted to the user terminal (100 of FIG. 1) through the communication interface 230, or speech section information about the personalized information section and the general information section is received from the user terminal (100 of FIG. 1). The speech section information may include section marking information that marks a location of at least one of the personalized information section and the general information section in the speech signal.

According to the present exemplary embodiment, since the server 200 performs the data processing on only the speech signal corresponding to the general information section, the personalized model is not used during the data processing. Therefore, any type of information, including the personal information, is not transmitted between the server 200 and the user terminal (100 of FIG. 1), and any personal information is not stored in the server 200. Consequently, according to the present exemplary embodiment, it is possible to implement a speech processing system having a higher performance and a higher processing speed while fundamentally protecting the personal information.

The controller 250 according to the present exemplary embodiment may perform control such that a speech signal is received through the receiver 210, data processing is performed on the speech signal corresponding to the general information section which is a section of the speech signal except for the personalized information section, by using a general model, and a result of data processing is transmitted to the user terminal (100 of FIG. 1) through the communication interface 230. The controller 250 may generate speech section information about a personalized speech section in the speech signal and transmit the generated speech section information to the user terminal (100 of FIG. 1). The speech section information may include section marking information that marks a location of at least one of the personalized information section and the general information section in the speech signal.

According to the present exemplary embodiment, since the server 200 performs the data processing on the received speech signal by using only the general model, the personalized model is not used during the data processing. Therefore, any type of information, including the personal information, is not transmitted between the server 200 and the user terminal (100 of FIG. 1), and any personal information is not stored in the server 200. Consequently, according to the present exemplary embodiment, it is possible to implement a speech processing system having a higher performance and a higher processing speed while fundamentally protecting the personal information.

Figure 3:
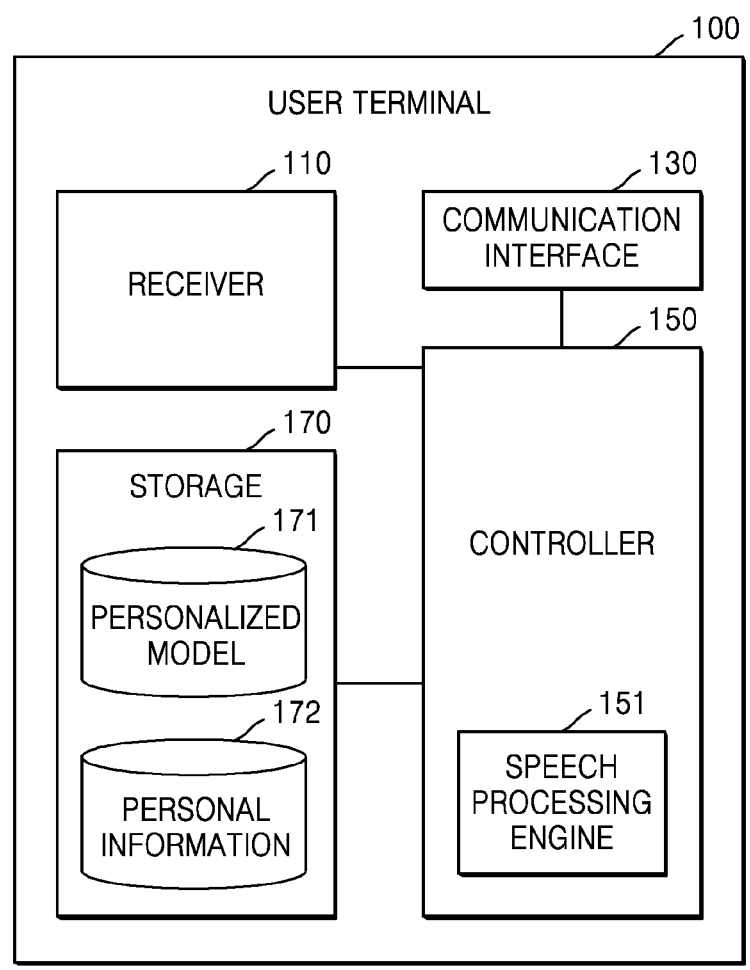
FIG. 3 is a block diagram illustrating a detailed internal configuration of the user terminal of FIG. 1.

FIG. 3 is a block diagram illustrating a detailed internal configuration of the user terminal 100 of FIG. 1. In the following, elements of FIG. 3 redundant to those of FIG. 1 will not be described.

The controller 150 may include a speech processing engine 151. According to the present exemplary embodiment, the speech processing engine 151 may include an ASR engine and an NLU engine and perform ASR and NLU by data processing on the received speech signal. At this time, the ASR engine and the NLU engine may process the speech signal by using an SR model and an NLU model, respectively.

The SR model may include an acoustic model and a language model. The acoustic model may be a model for the speech signal and may be generated from a large amount of collected speech data through a statistical method. The language model may be a grammar model for a user's speech and may be obtained from a large amount of collected text data through a statistical method. The NLU model may be a semantic model for a user's speech and may be obtained from a large amount of text data through statistical learning or may be obtained by making a semantic comprehension rule taking into consideration a usage scenario.

The user terminal 100 may further include a storage 170. The storage 170 may store programs and data necessary for operations of the user terminal 100. The storage 170 may include a volatile storage medium, a nonvolatile storage medium, or a combination thereof. The volatile storage medium may include a semiconductor memory such as RAM, dynamic RAM (DRAM), or static RAM (SRAM), and the nonvolatile storage medium may include a hard disk, a flash NAND memory, and the like.

According to the present exemplary embodiment, the storage 170 may store personal information 172. The personal information 172 may be information capable of identifying each individual directly or indirectly, and a type of data stored in the storage 170 may be changed according to a type of the user terminal 100. For example, in the case of a mobile device, the personal information 172 may include a contact, a music list, contents of short messages, incoming and outgoing history of the short messages, and a web browsing history, and in the case of the TV, the personal information 172 may include an individual's playback list.

In addition, the storage 170 may store a personalized model 171. The personalized model 171 may be a speech processing model to which individual characteristics generated by using the personal information 172 are reflected. The storage 170 may store a personalized SR model and/or a personalized NLU model. The use of the personalized SR model and/or the personalized NLU model makes it possible to implement a speech processing system having a higher performance.

Figure 4:
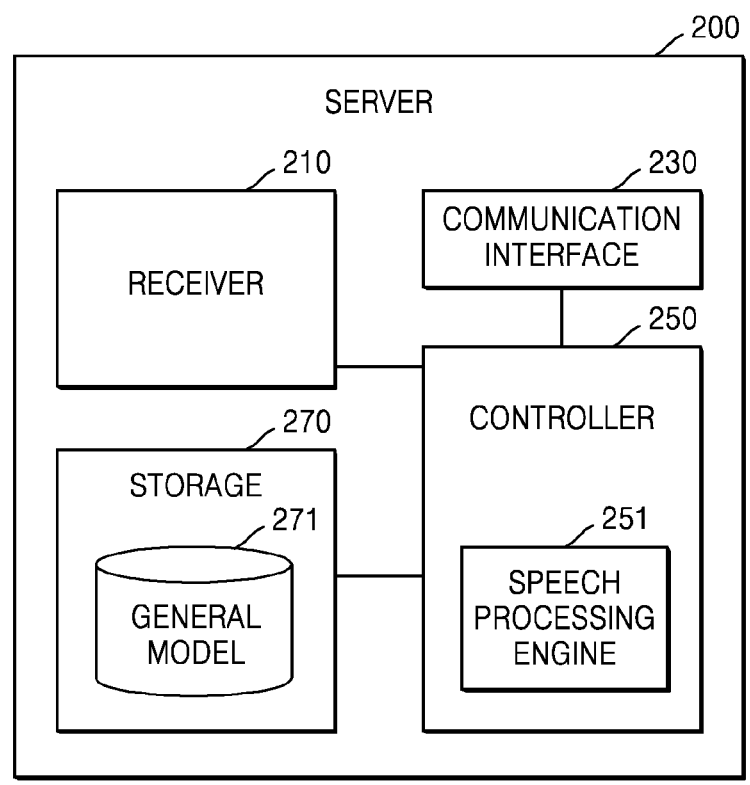
FIG. 4 is a block diagram illustrating a detailed internal configuration of the server of FIG. 2.

FIG. 4 is a block diagram illustrating a detailed internal configuration of the server 200 of FIG. 2. In the following, elements of FIG. 4 redundant to those of FIG. 2 will not be described.

The controller 250 may include a speech processing engine 251. According to the present exemplary embodiment, the speech processing engine 251 may include an ASR engine and an NLU engine and perform ASR and NLU by data processing on the received speech signal. At this time, the SR engine and the NLU engine may process the speech signal by using an SR model and an NLU model, respectively.

The server 200 may further include a storage 270. The storage 270 may store programs and data necessary for operations of the server 200. The storage 270 may include a volatile storage medium, a nonvolatile storage medium, or a combination thereof. The volatile storage medium may include a semiconductor memory such as RAM, DRAM, or SRAM, and the nonvolatile storage medium may include a hard disk, a flash NAND memory, and the like. According to the present exemplary embodiment, the storage 270 may store a general model 271. The general model 271 may be a general speech processing model and may be a speech processing model for processing speeches of many and unspecified persons instead of a specific individual. The general model 271 having a large capacity may provide a high speech processing performance with respect to a user's various language expressions (large vocabulary) in combination with a high arithmetic capacity of the server 200. Therefore, according to the present exemplary embodiment, since any type of personal information is not stored in the storage 270, it is possible to provide a higher speech processing performance while fundamentally protecting the personal information.

Hereinafter, the operations of the user terminal 100 and the server 200 will be described in more detail.

Figure 5:
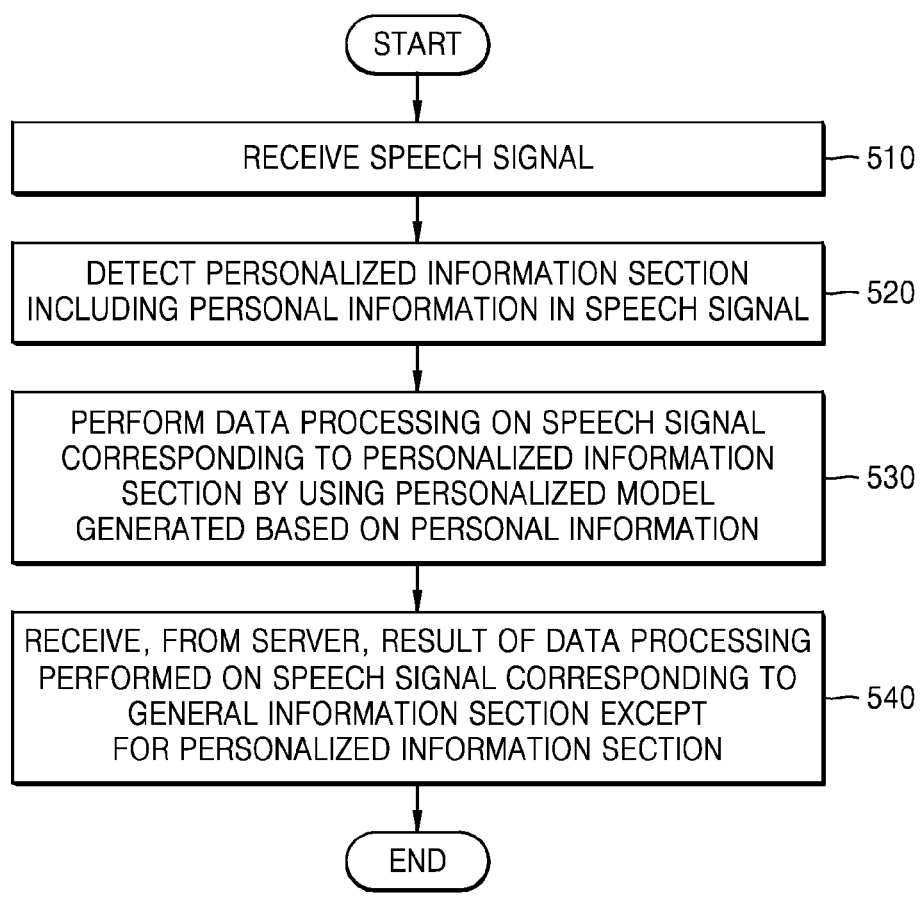
FIG. 5 is a flowchart of a speech signal processing method of a user terminal, according to an exemplary embodiment.

FIG. 5 is a flowchart of a speech signal processing method of the user terminal 100, according to an exemplary embodiment.

First, in operation 510, the user terminal 100 may receive a speech signal. The user terminal 100 may receive a speech signal through various elements. It is common that the user terminal 100 receives the speech signal through the microphone, but the user terminal 100 may also receive the speech signal through the USB interface or the DVD interface. Furthermore, the user terminal 100 may receive the speech signal through communication with an external device. According to the present exemplary embodiment, the user terminal 100 may transmit the received speech signal to the server 200.

In operation 520, the user terminal 100 may detect a personalized information section including personal information in the speech signal. The personalized information section may mean a section of the speech signal which includes personal information capable of identifying each individual directly or indirectly. For example, the user terminal 100 may detect a section of the speech signal which includes a name stored in a phone book of a user terminal, a user's search history, or user location information, as the personalized information section, with reference to the personal information 172 stored in the storage 170 of FIG. 3. Details will be described below with reference to FIG. 7.

Figure 7:
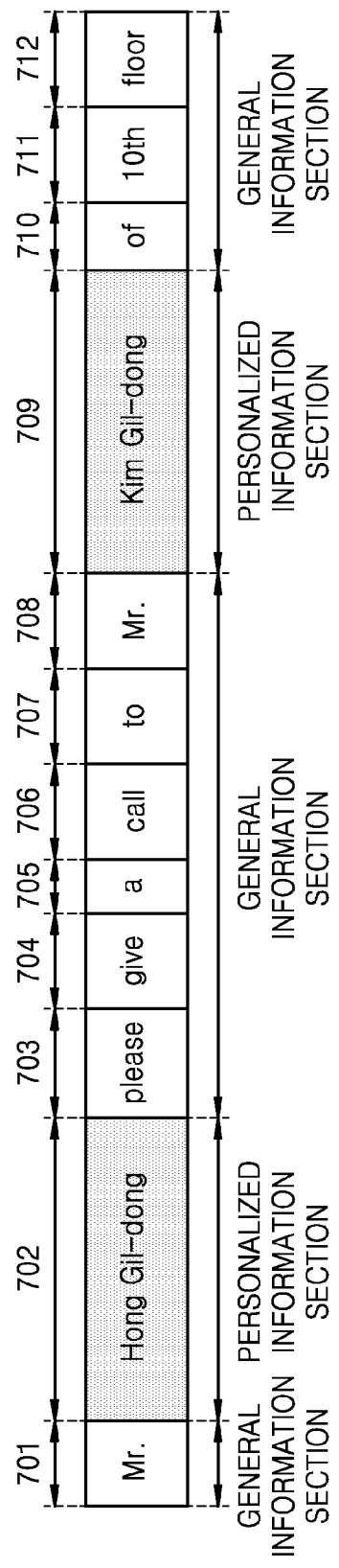
FIG. 7 is a diagram for describing a personalized information section and a general information section.

FIG. 7 is a diagram for describing the personalized information section and the general information section.

Referring to FIG. 7, a sentence "Mr. Hong Gil-dong, please give a call to Mr. Kim Gil-dong of 10th floor" may be divided into twelve sections. That is, the sentence may be divided into "Mr." 701, "Hong Gil-dong" 702, "please" 703, "give" 704, "a" 705, "call" 706, "to" 707, "Mr." 708, "Kim Gil-dong" 709, "of" 710, "10th" 711 and "floor" 712. The division criteria for these sections may be differently applied according to situations.

When it is assumed that "Hong Gil-dong" 702 is a word indicating the user and "Kim Gil-dong" 709 is a name stored in the phone book of the user terminal, a speech signal section corresponding to "Hong Gil-dong" 702 and "Kim Gil-dong" 709 correspond to the personalized information section. That is, "Hong Gil-dong" 702" and "Kim Gil-dong" 709 may correspond to the personal information, and the sections 701 and 705 including the personal information may correspond to the personalized information section. In operation 520, the user terminal 100 may detect the personalized information section including the personal information in the speech signal.

The user terminal 100 may detect the personalized information section by using various methods. For example, a word that is not included in a dictionary may be determined as personal information, and a speech section including the corresponding word may be determined as the personalized information section. However, such a method is merely exemplary, and the personalized information section may be detected by using various detection methods.

In addition, the user terminal 100 may generate speech section information about the personalized information section and the general information section by using the detected personalized information section and transmit the generated speech section information to the server 200. The speech section information may include section marking information that marks a location of at least one of the personalized information section and the general information section in the speech signal. That is, the user terminal 100 may mark the personalized information section and/or the general information section in the speech signal so as to discriminate these sections from one another, and generate and transmit speech section information including the section marking information to the server 200. The speech section information transmitted to the server 200 may be used to confirm and/or process the general information section in the speech signal. The server 200 may confirm the other section, which is a section of the speech signal except for the section marked as the general information section or the section marked as the personalized information section, and perform data processing on the corresponding speech signal.

Referring to FIG. 5 again, in operation 530, the user terminal 100 may perform data processing on the speech signal corresponding to the personalized information section by using the personalized model 171 generated based on the personal information. The personalized model 171 may be a speech processing model to which individual characteristics are reflected and may be a speech processing model customized for a specific individual. In a case where the data processing is performed on the speech signal by using the personalized model 171, more accurate speech processing may be performed, as compared with the general model 271 for many and unspecified persons. In addition, since the user terminal 100 directly performs the data processing on the speech signal corresponding to the personalized information section by using the personalized model 171, it is unnecessary to transmit the personalized model 171, including the personal information, to the external device such as the server 200, thus fundamentally protecting the personal information.

In operation 540, the user terminal 100 may receive, from the server 200, a result of the data processing performed on the speech signal corresponding to the general information section that is the other section which is a section of the speech signal except for the personalized information section. The general information section may mean the other section of the speech signal, which is a section of the speech signal except for the personalized information section, which includes general information other than the personal information. For example, a section including a sentence having a general meaning, such as "call me" or "did you eat?", may correspond to the general information section. Details will be described below with reference to FIG. 7.

As described above, in FIG. 7, the sentence "Mr. Hong Gil-dong, please give a call to Mr. Kim Gil-dong of 10th floor) may be divided into twelve sections.

Herein, "Mr." 701, "please" 703, "give" 704, "a" 7065, "call" 706, "to" 707, "Mr." 708, "of" 710, "10th" 711 and "floor" 712 are general words, and the sections 701, 703, 704, 706, 707, 708, 710, 711 and 712 correspond to the general information section.

In operation 540, the user terminal 100 may receive the result of the data processing from the server 200 having a higher arithmetic capacity than the user terminal 100, without directly performing the data processing on the speech signal corresponding to the general information section including the general information in the speech signal. Therefore, quick data processing may be performed on the speech signal corresponding to the general information section.

The result of the data processing performed on the speech signal corresponding to the general information section, which is received from the server 200, may be a result obtained when the server 200 processes the speech signal corresponding to the general information section by using the general model 271. The general model 271 may provide a high speech processing performance with respect to a user's various language expressions (large vocabulary) in combination with a high arithmetic capacity of the server 200. In addition, since the server 200 has a high arithmetic capacity, it is possible to perform quick data processing in the general information section.

The user terminal 100 may receive speech section information about the personalized information section and the general information section from the server 200. The speech section information may include section marking information that marks a location of at least one of the personalized information section and the general information section in the speech signal. The user terminal 100 may directly detect the personalized information section and generate the speech section information. However, since the user terminal 100 and the server 200 are capable of performing the data processing on the personalized information section and/or the general information section, which are directly detected, some sections may be omitted in the data processing when the personalized information section detected by the user terminal 100 is different from the personalized information section detected by the server 200. Therefore, in order to perform the data processing on the entire sections without omission, the user terminal 100 and the server 200 may share the speech section information about the personalized information section and the general information section with each other.

Furthermore, the user terminal 100 may output the result of the data processing to the user.

Consequently, according to the present exemplary embodiment, the personal information 172 or the personalized model 171 may be maintained in the user terminal 100, without being transmitted to the server 200, and the user terminal 100 may perform the speech processing by using the personal information 172 or the personalized model 171, thus implementing the speech processing system having a higher performance and a higher processing speed while fundamentally protecting the personal information.

Figure 6:
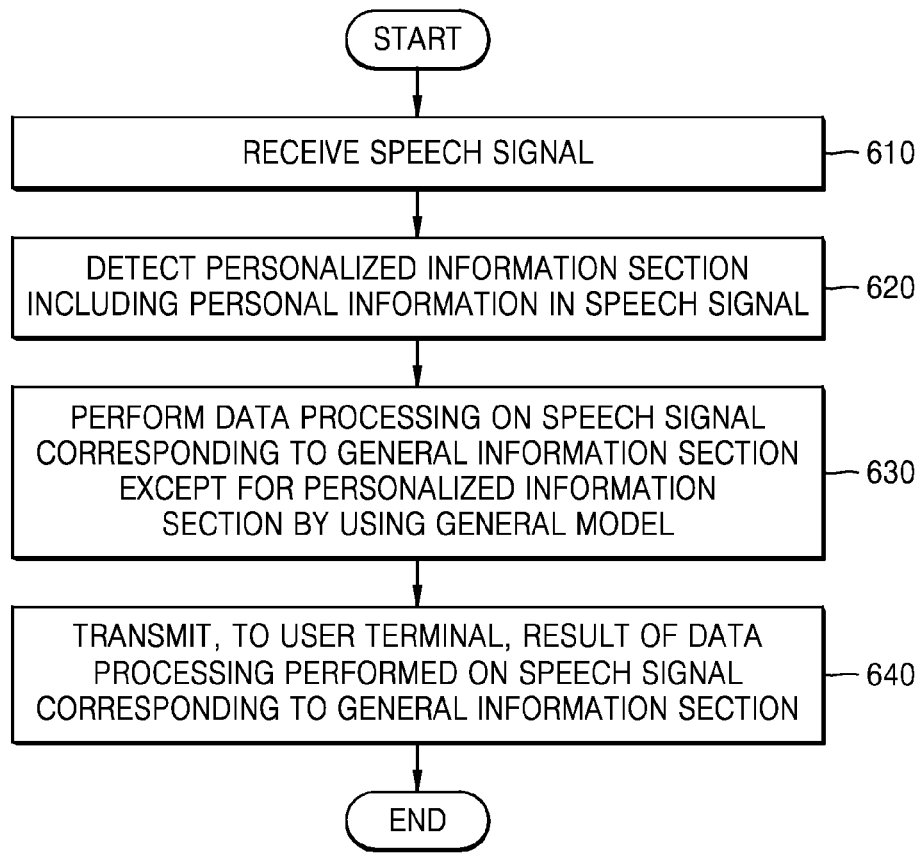
FIG. 6 is a flowchart of a speech signal processing method of a server, according to an exemplary embodiment.

FIG. 6 is a flowchart of a speech signal processing method of the server 200, according to an exemplary embodiment.

First, in operation 610, the server 200 may receive a speech signal. The server 200 may receive a speech signal through various elements. It is common that the server 200 receives the speech signal from the user terminal 100, but the server 200 may also receive the speech signal through the USB interface or the DVD interface.

In operation 620, the server 200 may detect a personalized information section including personal information in the speech signal. The server 200 may detect the personalized information section by analyzing the received speech signal, and may detect the personalized information section by parsing the speech section information received from the user terminal 100. The server 200 may detect the personalized information section by using various methods. For example, a word that is not included in a dictionary may be determined as personal information, and a speech section including the corresponding word may be determined as the personalized information section. However, such a method is merely exemplary, and the personalized information section may be detected by using various detection methods.

Since the personalized information section and the general information section have been described above with reference to FIG. 7, a redundant description thereof will be omitted.

In addition, the server 200 may generate speech section information about the personalized information section and the general information section by using the detected personalized information section and transmit the generated speech section information to the user terminal 100. The speech section information may include section marking information that marks a location of at least one of the personalized information section and the general information section in the speech signal. That is, the server 200 may mark the personalized information section and/or the general information section in the speech signal so as to discriminate these sections from one another, and generate and transmit speech section information including the section marking information. The speech section information transmitted to the user terminal 100 may be used to confirm and/or process the personalized information section in the speech signal. The user terminal 100 may confirm the other section, which is a section of the speech signal except for the section, marked as the general information section or the section marked as the personalized information section, and perform data processing on the corresponding speech signal.

In operation 630, the server 200 may perform data processing on the speech signal corresponding to the general information section, that is, the other section which is a section of the speech signal except for the personalized information section, by using the general model 271. The general model 271 may provide a high speech processing performance with respect to a user's various language expressions (large vocabulary) in combination with a high arithmetic capacity of the server 200. In addition, since the server 200 has a high arithmetic capacity, it is possible to perform quick data processing in the general information section. Furthermore, the server 200 does not process the speech signal corresponding to the personalized information section including the personal information, and the user terminal 100 having the personalized model 171 performs data processing, but fundamentally protecting the personal information.

In operation 640, the server 200 may transmit, to the user terminal 100, a result of the data processing performed on the speech signal corresponding to the general information section.

The server 200 may receive speech section information about the personalized information section and the general information section from the user terminal 100. The speech section information may include section marking information that marks a location of at least one of the personalized information section and the general information section in the speech signal. The server 200 may directly detect the personalized information section and generate the speech section information. However, since the user terminal 100 and the server 200 are capable of performing the data processing on the personalized information section and/or the general information section, which are directly detected, some sections may be missing in the data processing when the personalized information section detected by the user terminal 100 is different from the personalized information section detected by the server 200. Therefore, in order to perform the data processing on the entire sections without omission, the user terminal 100 and the server 200 may share the speech section information about the personalized information section and the general information section with each other.

Consequently, according to the present exemplary embodiment, it is possible to implement a speech processing system having a higher performance and a higher processing speed while fundamentally protecting the personal information.

Figure 8:
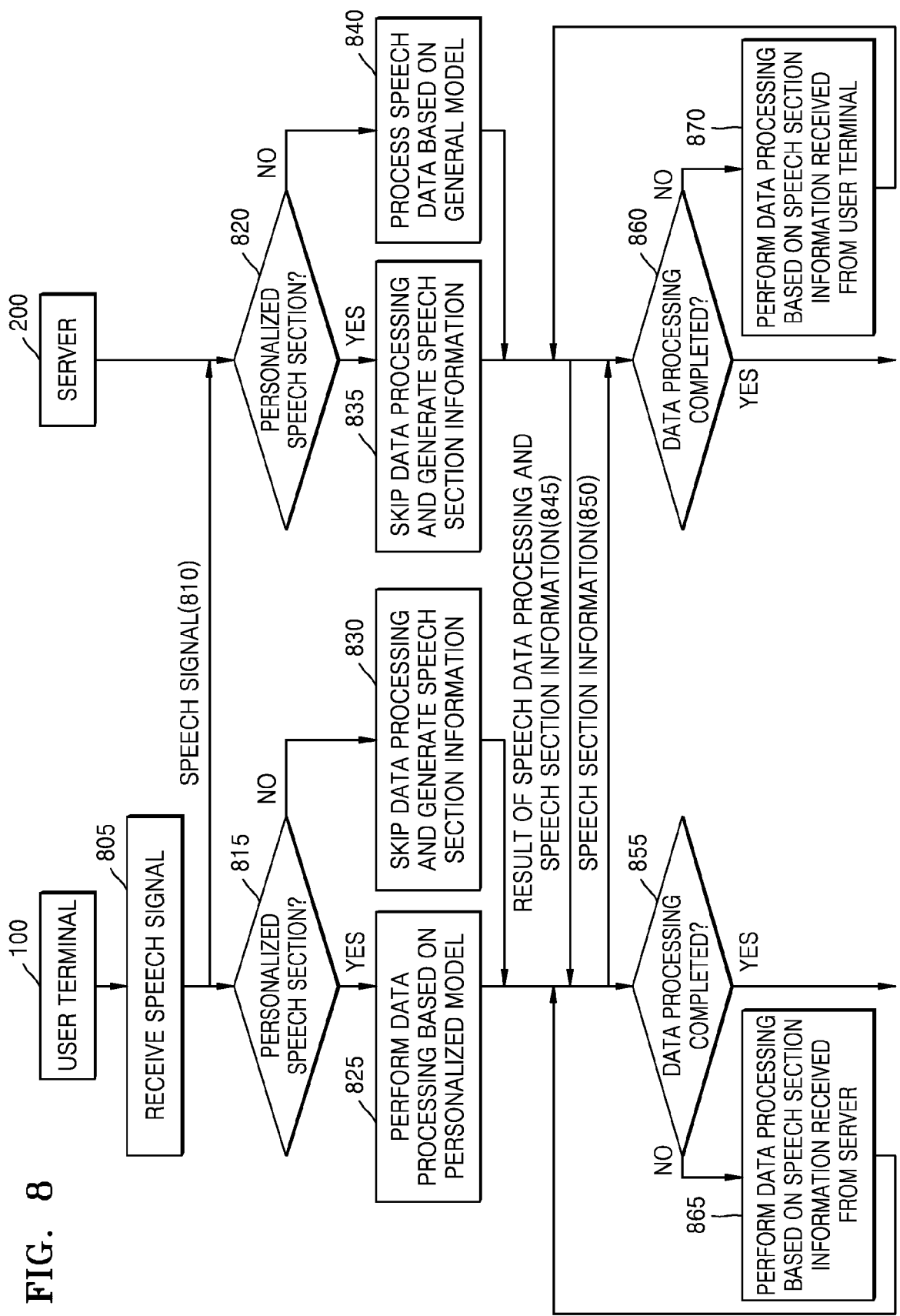
FIG. 8 is a flowchart of operation processes of a user terminal and a server, according to an exemplary embodiment.

FIG. 8 is a flowchart of operation processes of the user terminal 100 and the server 200, according to an exemplary embodiment;

First, in operation 805, the user terminal 100 may receive a speech signal. As described above, the user terminal 100 may receive a speech signal through various elements. It is common that the user terminal 100 receives the speech signal through the microphone, but the user terminal 100 may also receive the speech signal through the USB interface or the DVD interface. Furthermore, the user terminal 100 may receive the speech signal through communication with an external device. In operation 810, the user terminal 100 may transmit the received speech signal to the server 200.

In operations 815 and 820, the user terminal 100 and the server 200 may detect a personalized information section from the speech signal, respectively. The user terminal 100 and the server 200 may detect the personalized information section by using various methods. For example, a word that is not included in a dictionary may be determined as personal information, and a speech section including the corresponding word may be determined as the personalized information section. However, such a method is merely exemplary, and the personalized information section may be detected by using various detection methods.

When the personalized speech section is detected in operation 815, the user terminal 100 may proceed to operation 825 to process speech data based on the personalized model 171. When the general information section which is a section of the speech signal except for the personalized speech section is detected in operation 815, the user terminal 100 may proceed to step 830 to skip the data processing and generate speech section information. When the personalized speech section is detected in operation 820, the server 200 may proceed to operation 835 to skip the data processing and generate speech section information. When the general information section which is a section of the speech signal except for the personalized speech section is detected in operation 820, the server 200 may proceed to step 840 to process speech data based on the general model 271.

Through these processes, the user terminal 100 may directly perform the data processing on the speech signal corresponding to the personalized information section by using the personalized model 171, and the server 200 may perform data processing on the speech signal corresponding to the general information section by using the general model 271 based on the high arithmetic capacity, thus implementing a high speech processing performance while fundamentally protecting the personal information.

In operations 845 and 850, the user terminal 100 and the server 200 may share the speech section information and the result of the data processing with each other. That is, in operation 845, the server may transmit the result of the speech data processing and the speech section information to the user terminal 100, and the user terminal 100 may transmit the speech section information to the server 200. In FIG. 8, these processes are illustrated as operation 845 and operation 850, but either the user terminal 100 or the server 200 may first transmit data during the sharing.

As described above, the user terminal 100 and the server 200 may directly detect the personalized information section and generate the speech section information. However, since the user terminal 100 and the server 200 are capable of performing the data processing on the personalized information section and/or the general information section, which are directly detected, some sections may be omitted in the data processing when the personalized information section detected by the user terminal 100 is different from the personalized information section detected by the server 200. Therefore, in order to perform the data processing on the entire sections without omission, the user terminal 100 and the server 200 may share the speech section information about the personalized information section and the general information section with each other.

In operation 855, the user terminal 100 determines whether the data processing on the entire speech signal sections is completed. When it is determined in operation 855 that the data processing is completed, the user terminal ends the operation. When it is determined in operation 855 that the data processing is not completed, the user terminal 100 proceeds to operation 865 to perform data processing on the unprocessed speech section by using the personalized model 171, based on the speech section information received from the server 200. In operation 860, the server 200 determines whether the data processing on the entire speech signal sections is completed. When it is determined in operation 860 that the data processing is completed, the server 200 ends the operation. When it is determined in operation 860 that the data processing is not completed, the server 200 proceeds to operation 870 to perform data processing on the unprocessed speech section by using the personalized model 171, based on the speech section information received from the user terminal 100.

As illustrated in FIG. 8, the user terminal 100 and the server 200 may simultaneously perform the speech signal processing of operations 815 to 870 in parallel, and the user terminal 100 and the server 200 may be alternately switched to perform the speech signal processing.

In a case where the user terminal 100 and the server 200 are alternately switched to perform the speech signal processing, if the user terminal 100 transmits the speech section information to the server 200 when the speech signal corresponding to the general information section appears while the user terminal 100 performs the data processing on the speech signal corresponding to the personalized information section based on the personalized model 171, the server 200 may perform the speech processing from a speech signal next the speech signal, on which the data processing has been performed by the user terminal 100, by using the general model 271. Thereafter, in a case where the speech signal corresponding to the personalized information section appears again, if the server 200 transmits the result of the data processing so far and the speech section information to the user terminal 100, the user terminal 100 may perform the speech processing on a speech signal next the speech signal, on which the data processing has been performed by the server 200, by using the general model 271.

On the contrary, in a case where the server 200 starts the speech processing and the speech signal corresponding to the personalized information section appears while the server 200 performs the speech processing on the speech signal corresponding to the general information section by using the general model 271, if the server 200 transmits the result of the data processing so far and the speech section information to the user terminal 100, the user terminal 100 may perform the speech processing on a speech signal next the speech signal, on which the data processing has been performed by the server 200, by using the general model 271.

According to the present exemplary embodiment, it is possible to implement a speech processing system having a higher performance and a higher processing speed while fundamentally protecting the personal information.

Figure 9:
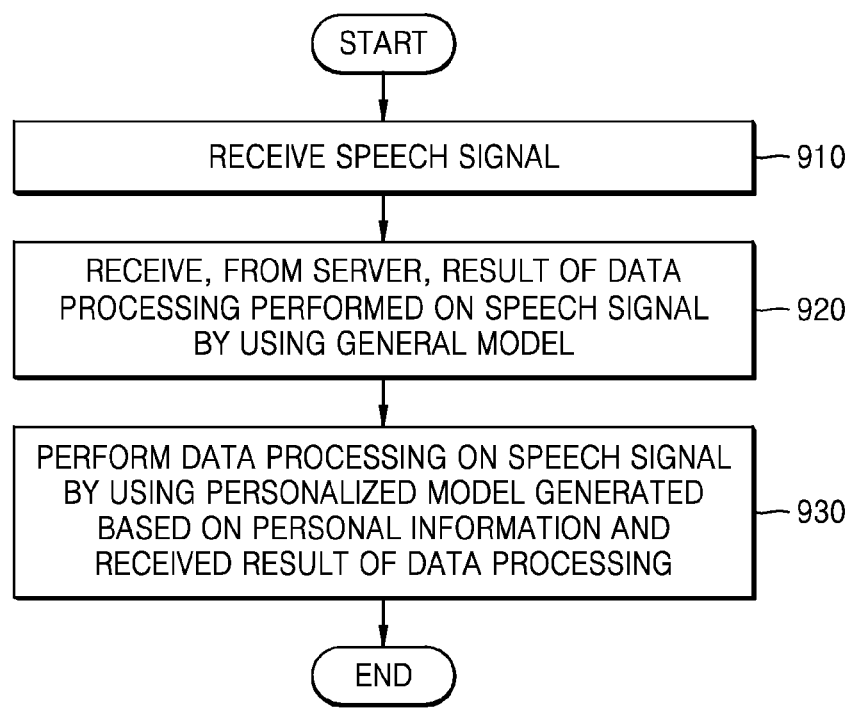
FIG. 9 is a flowchart of a speech signal processing method of a user terminal, according to another exemplary embodiment.

FIG. 9 is a flowchart of a speech processing method of the user terminal 100, according to another exemplary embodiment.

First, in operation 910, the user terminal 100 may receive a speech signal. The user terminal 100 may receive a speech signal through various elements. It is common that the user terminal 100 receives the speech signal through the microphone, but the user terminal 100 may also receive the speech signal through the USB interface or the DVD interface. Furthermore, the user terminal 100 may receive the speech signal through communication with an external device. According to the present exemplary embodiment, the user terminal 100 may transmit the received speech signal to the server 200.

In operation 920, the user terminal 100 may receive, from the server 200, the result of the data processing performed on the speech signal by using the general model 271. That is, the user terminal 100 may receive, from the server 200, the result of the data processing performed on the speech signal independently of the user terminal 100. The general model 271 may provide a high speech processing performance with respect to a user's various language expressions (large vocabulary) in combination with a high arithmetic capacity of the server 200. In addition, since the server 200 has a high arithmetic capacity, it is possible to perform quick data processing in the general information section.

In operation 930, the user terminal 100 may perform data processing on the speech signal by using the personalized model 171 which is generated based on the personal information and the result of the data processing which is received from the server 200. According to the present exemplary embodiment, the user terminal 100 may perform data processing again on all or part of the speech signal by using the personalized model 171 and the result of the data processing which is received from the server 200. As described above, since the server 200 performs the data processing by using the general model 271, the data processing is performed again by using the personalized model 171 so as to improve the speech processing performance.

In this case, the user terminal 100 may perform the data processing on the speech signal corresponding to the personalized information section including the personal information. That is, the server 200 may perform the data processing on the entire speech signal by using the general model 271, without discriminating the general information section or the personalized information section by using the high arithmetic capacity. Thereafter, the user terminal 100 may perform the data processing again by using the personalized model with respect to the personalized information section capable of improving the processing performance by using the personal information 172. To this end, the user terminal 100 may detect the personalized information section in the speech signal. The user terminal 100 may detect the personalized information section by using various methods. For example, a word that is not included in a dictionary may be determined as personal information, and a speech section including the corresponding word may be determined as the personalized information section. However, such a method is merely exemplary, and the personalized information section may be detected by using various detection methods.

Alternatively, the user terminal 100 may receive speech section information about the personalized information section and the general information section from the server 200. Since the user terminal 100 receives the speech section information generated by the server 200 having the high arithmetic capacity, it is possible to reduce the data processing burden of the user terminal 100 and increase the entire speech processing speed accordingly. The speech section information may include section marking information that marks a location of at least one of the personalized information section and the general information section in the speech signal.

Since the personalized information section and the general information section have been described above with reference to FIG. 7, a redundant description thereof will be omitted.

The personalized model 171 may be at least one of a personalized SR model, a personalized NLU model, and a personalized lexical model.

When the user terminal 100 performs the data processing on the speech signal by using the personalized SR model, the user terminal 100 may receive, from the server, the result of the data processing based on a phoneme, a pseudo morpheme, or a word. In addition, the user terminal 100 may receive a result of multi-pass processing, such as N-best hypothesis, lattice, or confusion network, and use the received result of the multi-pass processing for the data processing.

When the user terminal 100 performs the data processing on the speech signal by using the personalized NLU model, the user terminal 100 may receive, from the server, the result of the data processing based on a phoneme, a pseudo morpheme, or a word and information about confidence score based on a sentence or a word, and use the received result of the data processing or the received information for the data processing. In addition, the user terminal 100 may receive the result of the multi-pass processing from the server 200 and use the received result of the multi-pass processing for the data processing.

When the user terminal 100 performs the data processing on the speech signal by using the personalized lexical model, the user terminal 100 may receive, from the server, the result of the data processing based on a phoneme, a pseudo morpheme, or a word and information about confidence score based on a sentence or a word, and use the received result of the data processing or the received information for the data processing. In addition, the user terminal 100 may perform the data processing by using an individual word list and the result of the data processing received from the server 200. In this case, a phonetic dictionary may be used for phoneme-based comparison between hypothesis and individual word.

Even though any model is used, it is unnecessary to transmit the personal information to the server 200, thus achieving more accurate speech processing by the use of the personal information.

According to the present exemplary embodiment, since the speech processing using the personalized modeling is performed by only the user terminal 100, any type of information, including the personal information, is not transmitted between the server 200 and the user terminal 100, and any personal information is not stored in the server 200. Therefore, it is possible to implement a speech processing system having a higher performance and a higher processing speed while fundamentally protecting the personal information.

Figure 10:
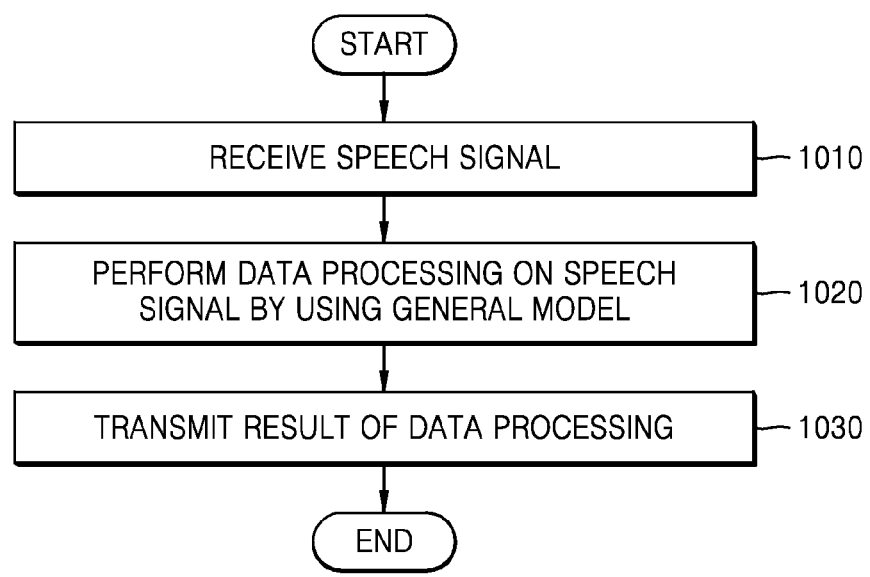
FIG. 10 is a flowchart of a speech signal processing method of a server, according to another exemplary embodiment.

FIG. 10 is a flowchart of a speech processing method of the server 200, according to another exemplary embodiment.

First, in operation 1010, the server 200 may receive a speech signal. The server 200 may receive a speech signal through various elements. It is common that the server 200 receives the speech signal from the user terminal 100, but the server 200 may also receive the speech signal through the USB interface or the DVD interface.

In operation 1020, the server 200 may perform data processing on the received speech signal by using the general model 271. That is, the server 200 may perform the data processing on the speech signal independently of the user terminal 100. The general model 271 may provide a high speech processing performance with respect to a user's various language expressions (large vocabulary) in combination with a high arithmetic capacity of the server 200. In addition, since the server 200 has a high arithmetic capacity, quick data processing is possible.

In operation 1030, the server 200 may transmit the result of the data processing to the user terminal 100. In this case, the server 200 may generate speech section information about the personalized information section and the general information section and transmit the generated speech section information to the user terminal 100. Since the server 200 having the high arithmetic capacity generates the speech section information and transmits the generated speech section information to the user terminal 100, it is possible to reduce the data processing burden of the user terminal 100 and increase the entire speech processing speed accordingly. The speech section information may include section marking information that marks a location of at least one of the personalized information section and the general information section in the speech signal.

Consequently, according to the present exemplary embodiment, it is possible to implement a speech processing system having a higher performance and a higher processing speed while fundamentally protecting the personal information.

Figure 11:
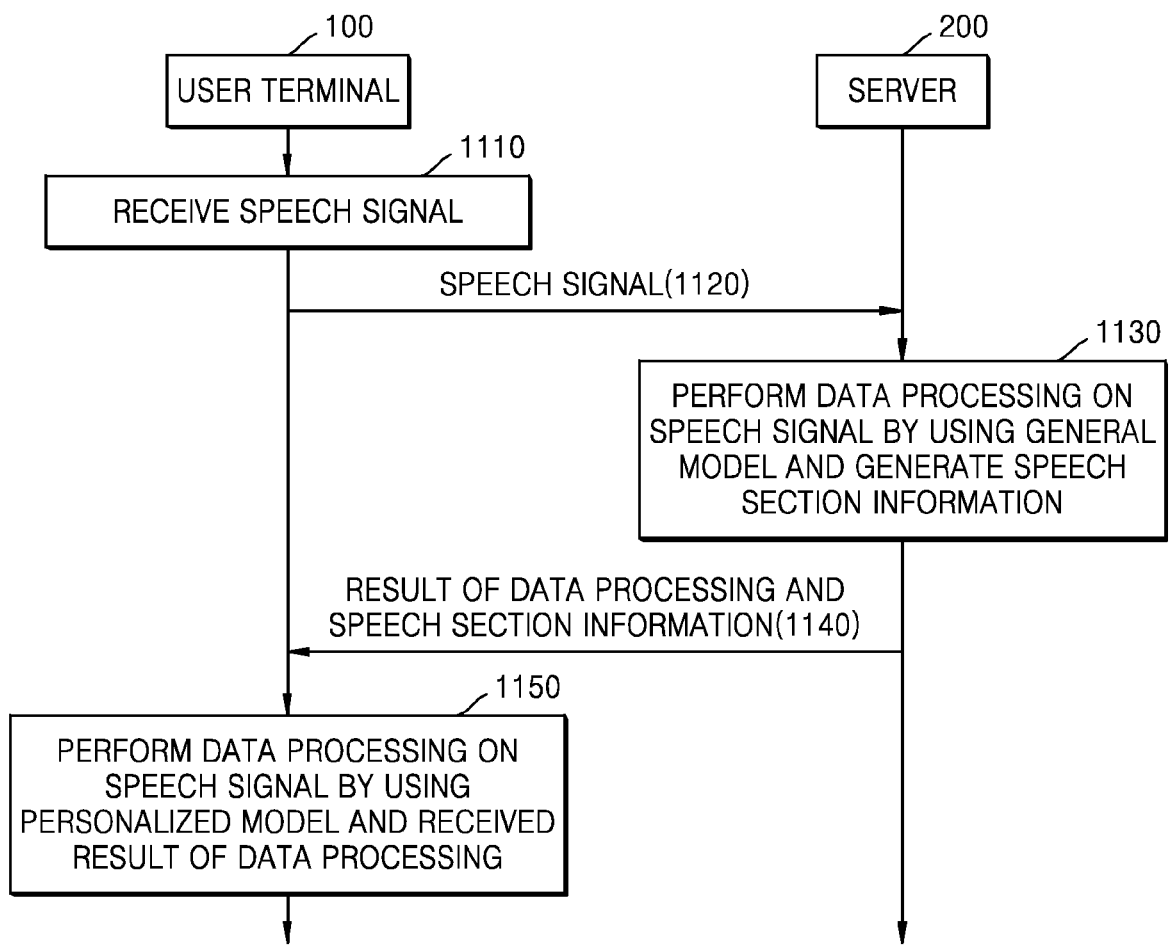
FIG. 11 is a flowchart of operation processes of a user terminal and a server, according to another exemplary embodiment.

FIG. 11 is a flowchart of operation processes of the user terminal 100 and the server 200, according to another exemplary embodiment;

First, in operation 1110, the user terminal 100 may receive a speech signal. As described above, the user terminal 100 may receive a speech signal through various elements. It is common that the user terminal 100 receives the speech signal through the microphone, but the user terminal 100 may also receive the speech signal through the USB interface or the DVD interface. Furthermore, the user terminal 100 may receive the speech signal through communication with an external device. In operation 1120, the user terminal 100 may transmit the received speech signal to the server 200.

In operation 1130, the server 200 may perform data processing on the received speech signal by using the general model 271. The general model 271 may provide a high speech processing performance with respect to a user's various language expressions (large vocabulary) in combination with a high arithmetic capacity of the server 200. In addition, since the server 200 has a high arithmetic capacity, quick data processing is possible.

At this time, the server 200 may generate speech section information about the personalized information section and the general information section. Since the server 200 having the high arithmetic capacity generates the speech section information, it is possible to reduce the data processing burden of the user terminal 100 and increase the entire speech processing speed accordingly.

In operation 1140, the server 200 may transmit a result of the data processing and the speech section information to the user terminal 100. In operation 1150, the user terminal 100 may perform data processing on the speech signal by using the personalized model 171 which is generated based on personal information and the result of the data processing which is received from the server 200. That is, the user terminal 100 may perform the data processing again on all or part of the speech signal. In order to further improve the speech processing performance, the data processing is performed again by using the personalized model 171.

In this case, the user terminal 100 may detect the personalized information section and perform the data processing on the speech signal corresponding to the personalized information section. In addition, the user terminal 100 may perform the data processing on the speech signal by using at least one of a personalized SR model, a personalized NLU model, and a personalized lexical model.

According to the present exemplary embodiment, since the speech processing using the personalized modeling is performed by only the user terminal 100, any type of information, including the personal information, is not transmitted between the server 200 and the user terminal 100, and any personal information is not stored in the server 200. Therefore, it is possible to implement a speech processing system having a higher performance and a higher processing speed while fundamentally protecting the personal information.

Figure 12:
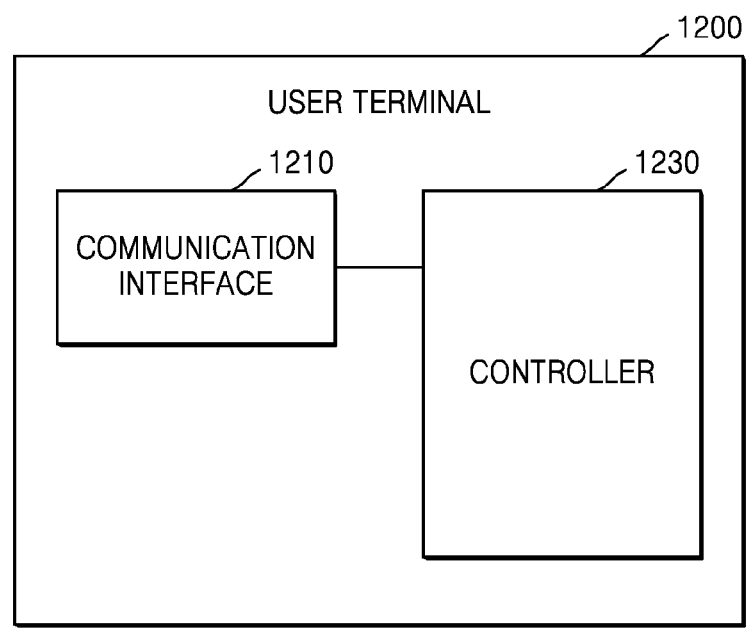
FIG. 12 is a block diagram illustrating an internal configuration of a user terminal according to another exemplary embodiment.

FIG. 12 is a block diagram illustrating an internal configuration of a user terminal 1200 according to another exemplary embodiment.

Referring to FIG. 12, the user terminal 1200 according to the present exemplary embodiment may include a communication interface 1210 and a controller 1230.

The communication interface 1210 may communicate with the external device. The communication interface 1210 may be connected to a network by wire or wireless and communicate with the external device. According to the present exemplary embodiment, the communication interface 1210 may communicate with a server and transmit/receive data to/from the server. According to the present exemplary embodiment, the communication interface 1210 may communicate with the server and transmit/receive data to/from the server. For example, the communication interface 1210 may include a short-range communication module, a mobile communication module, a wireless Internet module, and a wired Internet module. In addition, the communication interface 1210 may include one or more elements.

The controller 1230 may control an overall operation of the user terminal 1200 and process a speech signal by controlling the communication interface 1210. The controller 1230 may include a RAM configured to store a signal or data input from the outside of the user terminal 1200 or used as storage regions corresponding to various operations performed in an electronic device, a ROM configured to store a control program for controlling peripheral devices, and a processor. The processor may be implemented by an SoC in which a core (not illustrated) and a GPU (not illustrated) are integrated. In addition, the processor may include a plurality of processors.

The controller 1230 according to the present exemplary embodiment may perform control such that a mapping table is generated by mapping an identification (ID) to personal information, an ID-based personalized model is generated by using the mapping table, the ID-based personalized model is transmitted to the server through the communication interface 1210, a result of data processing performed on the speech signal by using the ID-based personalized model is received from the server, and the personal information corresponding to the ID is restored by using the result of the data processing and the mapping table. At this time, the controller 1230 may generate the mapping table by mapping an ID to additional information generated from the personal information. In this case, the controller 1230 may perform control such that a result of data processing performed on the additional information by using the ID-based personalized model is received from the server, and the additional information corresponding to the ID is restored by using the result of the data processing and the mapping table.

When the ID-based personalized model is generated by using the mapping table, the controller 1230 may perform control such that the ID mapped to the personal information is represented by using an acoustic unit ID that is an ID mapped to an acoustic unit. The acoustic unit ID may be an ID mapped to the acoustic unit according to prearrangement with the server. The acoustic unit ID may represent a specific portion of an SR model corresponding to a phonetic symbol, and the acoustic unit ID and the phonetic symbol may not be mapped one to one.

According to the present exemplary embodiment, since the personalized model is generated by masking the personal information and the additional information generated from the personal information with the ID directly assigned by the user terminal 100, it is difficult to restore the ID-masked personal information even when the personalized model is exposed to the outside, thus protecting the personal information. In addition, since the data processing is performed on the speech signal by transmitting the personalized model to the server having a high arithmetic capacity, it is possible to implement a speech processing system having a higher performance and a higher processing speed.

Figure 13:
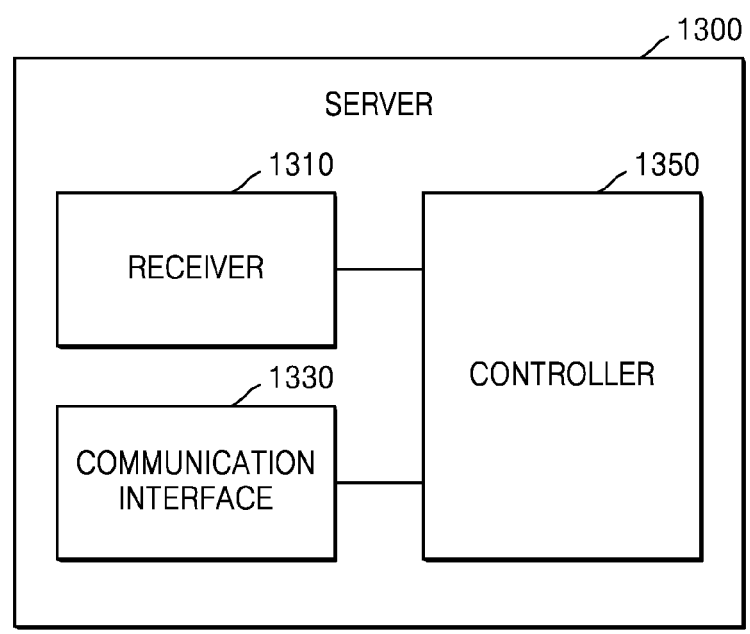
FIG. 13 is a block diagram illustrating an internal configuration of a server according to another exemplary embodiment.

FIG. 13 is a block diagram illustrating an internal configuration of a server 1300 according to another exemplary embodiment.

Referring to FIG. 13, the server 1300 according to the present exemplary embodiment may include a receiver 1310, a communication interface 1330, and a controller 1350.

The receiver 1310 may receive a speech signal. The receiver 1310 may include elements, such as a USB interface and a DVD interface, which are capable of receiving speech signals having various formats. For example, when the receiver 1310 includes the USB interface, the server 1300 may receive a speech signal file from a USB. In addition, when a speech signal is received from an external device through the communication interface 1330, the communication interface 1330 may perform the function of the receiver 1310.

The communication interface 1330 may communicate with the external device. The communication interface 1330 may be connected to a network by wire or wireless and communicate with the external device. According to the present exemplary embodiment, the communication interface 1330 may communicate with the user terminal (1200 of FIG. 12) and transmit/receive data to/from the user terminal (1200 of FIG. 12). According to the present exemplary embodiment, the communication interface 1330 may communicate with the server and transmit/receive data to/from the server. For example, the communication interface 1330 may include a short-range communication module, a mobile communication module, a wireless Internet module, and a wired Internet module. In addition, the communication interface 1330 may include one or more elements.

The controller 1350 may control an overall operation of the server 1300 and process a speech signal by controlling the receiver 1310 and the communication interface 1330. The controller 1350 may include a RAM configured to store a signal or data input from the outside of the server 1300 or used as storage regions corresponding to various operations performed in an electronic device, a ROM configured to store a control program for controlling peripheral devices, and a processor. The processor may be implemented by an SoC in which a core (not illustrated) and a GPU (not illustrated) are integrated. In addition, the processor may include a plurality of processors.

The controller 1350 according to the present exemplary embodiment may perform control such that an ID-based personalized model is received from the user terminal (1200 of FIG. 12) through the communication interface 1330, a speech signal is received through the receiver 1310, data processing is performed on the speech signal by using the ID-based personalized model, and a result of the data processing is transmitted to the user terminal (1200 of FIG. 12) through the communication interface 1330.

In addition, when the data processing is performed on the speech signal by using the ID-based personalized model, the controller 1350 may perform control such that an ID mapped to personal information is represented by using an acoustic unit ID that is an ID mapped to an acoustic unit according to prearrangement with the user terminal (1200 of FIG. 12).

According to the present exemplary embodiment, since the server 1300 receives the ID-based personalized model from the user terminal (1200 of FIG. 12) and performs the data processing by using the received ID-based personalized model, it is difficult to restore the ID-masked personal information even when the personalized model is exposed to the outside, thus protecting the personal information. In addition, since the server 1300 having a high arithmetic capacity performs the data processing on the speech signal, it is possible to implement a speech processing system having a higher performance and a higher processing speed.

Figure 14:
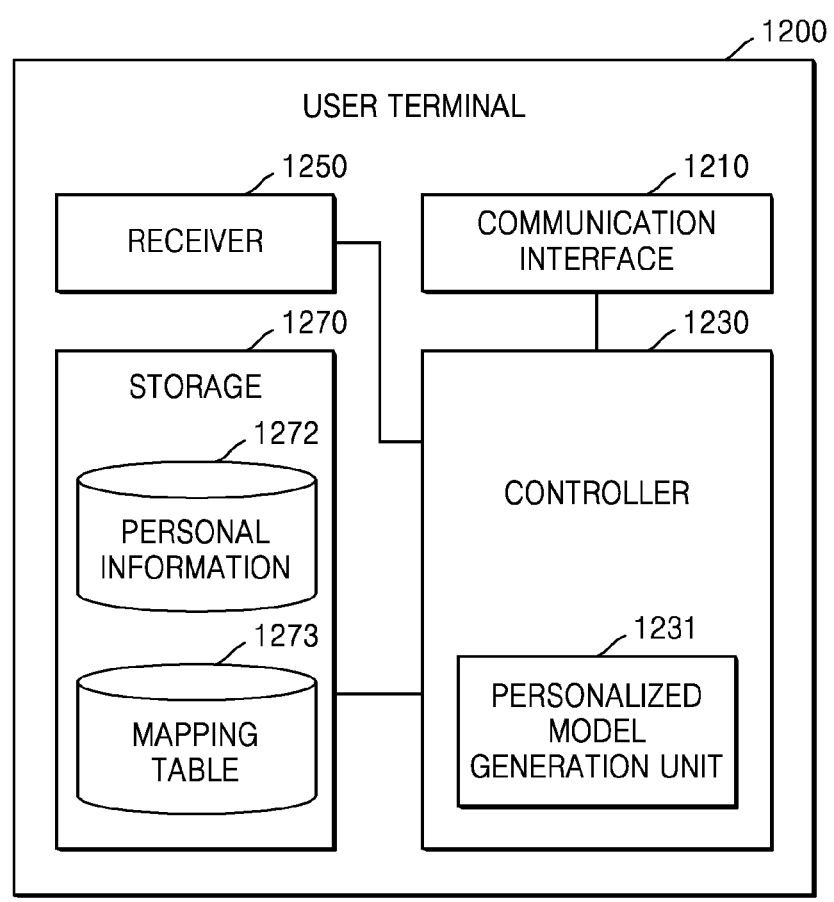
FIG. 14 is a block diagram illustrating a detailed internal configuration of the user terminal of FIG. 12.

FIG. 14 is a block diagram illustrating a detailed internal configuration of the user terminal 1200 of FIG. 12. In the following, elements of FIG. 14 redundant to those of FIG. 12 will not be described.

The controller 1230 may include a personalized model generator 1231. According to the present exemplary embodiment, the personalized model generator 1231 may generate a personalized model based on personal information 1272 stored in a storage 1270. The personalized model generator 1231 may generate a mapping table 1273 by mapping an ID to the personal information 1272 or additional information generated from the personal information 1272, and generate an ID-based personalized model by using the generated ID-based mapping table 1273.

The user terminal 1200 may further include a receiver 1250. The receiver 1250 may receive a speech signal. The receiver 1250 may include various elements, such as a microphone, a USB interface, or a DVD interface. For example, when the receiver 1250 includes the microphone, the user terminal 1200 may directly receive a user speech signal through the microphone. When the receiver 1250 includes the USB interface, the user terminal 1200 may receive a speech signal file from a USB. In addition, when a speech signal is received from an external device through the communication interface 1210, the communication interface 1210 may perform the function of the receiver 1250.

The user terminal 1200 may further include a storage 1270. The storage 1270 may store programs and data necessary for operations of the user terminal 1200. The storage 1270 may include a volatile storage medium, a nonvolatile storage medium, or a combination thereof. The volatile storage medium may include a semiconductor memory such as RAM, DRAM, or SRAM, and the nonvolatile storage medium may include a hard disk, a flash NAND memory, and the like. According to the present exemplary embodiment, the storage 1270 may store the personal information 1272 and the mapping table 1273.

The personal information 1272 may be information capable of identifying each individual directly or indirectly, and a type of data stored in the storage 1270 may be changed according to a type of the user terminal 1200. For example, in the case of a mobile device, the personal information 1272 may include a contact, a music list, contents of short messages, incoming and outgoing history of the short messages, and a web browsing history, and in the case of the TV, the personal information 1272 may include an individual's playback list.

The mapping table 1273 may include an ID corresponding to the personal information 1272 or the additional information generated from the personal information 1272. The personalized model generator 1231 may use the mapping table 1273 to generate the ID-based personalized model. In addition, the mapping table 1273 may be used for restoring the personal information 1272 or the additional information corresponding to the ID.

Figure 15:
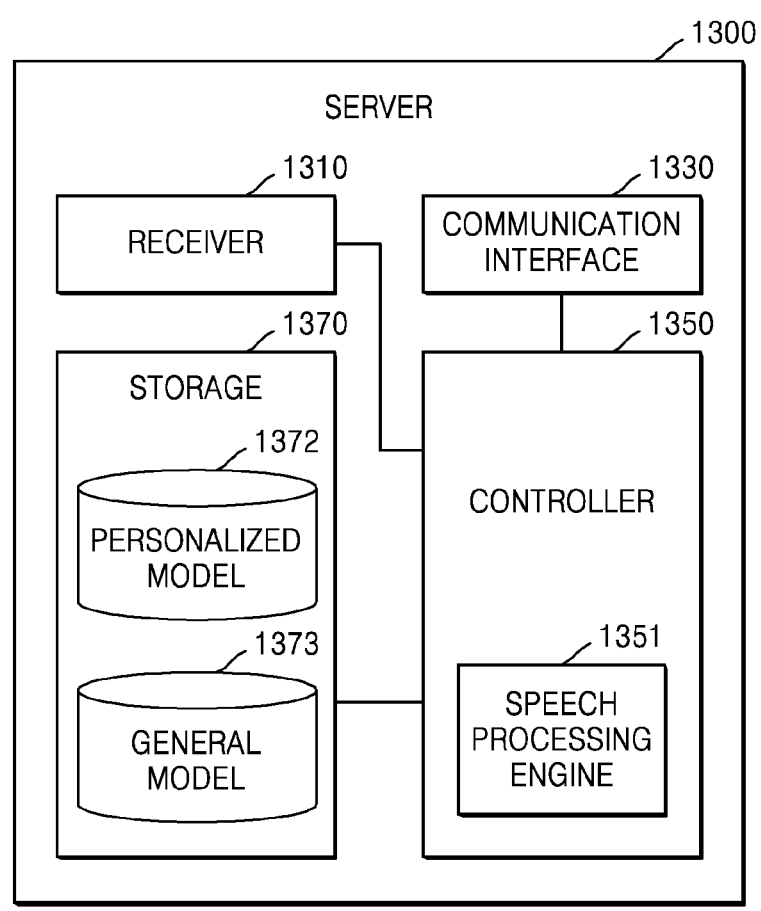
FIG. 15 is a block diagram illustrating a detailed internal configuration of the server of FIG. 13.

FIG. 15 is a block diagram illustrating a detailed internal configuration of the server 1300 of FIG. 13.

The controller 1350 may include a speech processing engine 1351. According to the present exemplary embodiment, the speech processing engine 1351 may include an ASR engine and an NLU engine and perform ASR and NLU by data processing on the received speech signal. At this time, the ASR engine and the NLU engine may process the speech signal by using an SR model and an NLU model, respectively.

The server 1300 may further include a storage 1370. The storage 1370 may store programs and data necessary for operations of the server 1300. The storage 1370 may include a volatile storage medium, a nonvolatile storage medium, or a combination thereof. The volatile storage medium may include a semiconductor memory such as RAM, DRAM, or SRAM, and the nonvolatile storage medium may include a hard disk, a flash NAND memory, and the like.

According to the present exemplary embodiment, the storage 1370 may store a personalized model 1372 and a general model 1373. The personalized model 1372 may be the ID-based personalized model received from the user terminal 1200. Even when the personalized model 1372 is exposed to the outside, it is difficult to restore the personal information 1272 masked with the ID, thus protecting the personal information 1272. The general model 1373 may be a general speech processing model and may be a speech processing model for processing speeches of many and unspecified persons instead of a specific individual. The general model 1373 having a large capacity may provide a high speech processing performance with respect to a user's various language expressions (large vocabulary) in combination with a high arithmetic capacity of the server 1300.

Hereinafter, the operations of the user terminal 1200 and the server 1300 will be described in more detail.

Figure 16:
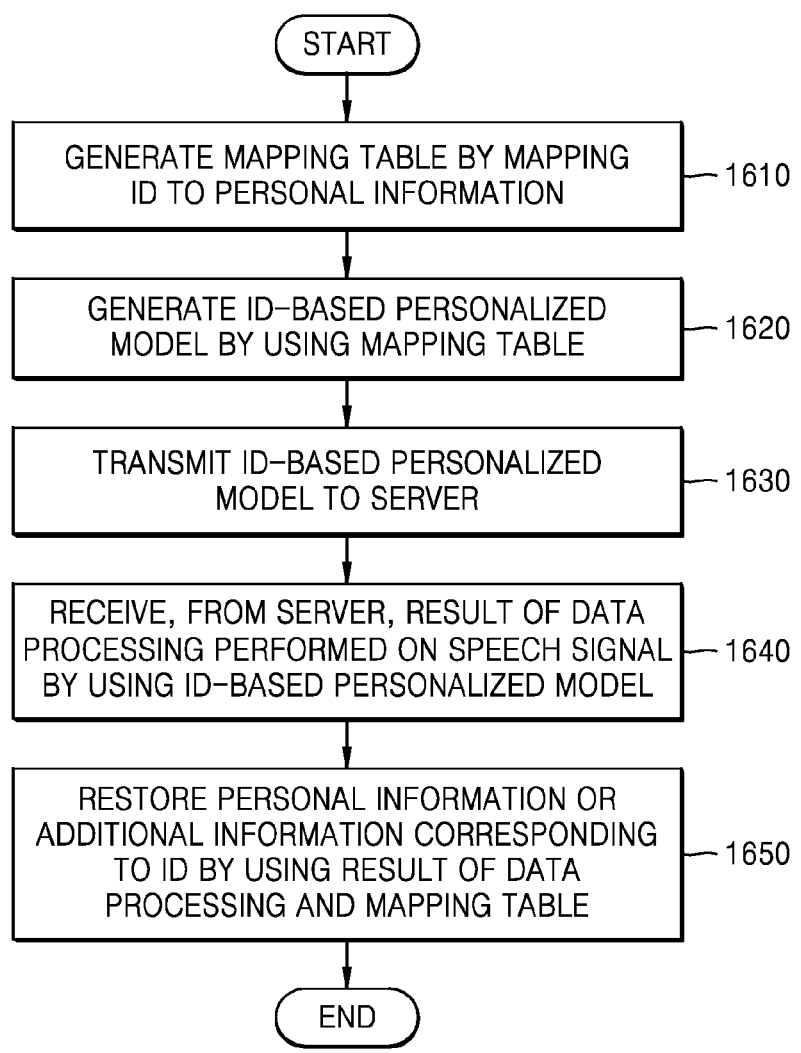
FIG. 16 is a flowchart of a speech signal processing method of a user terminal, according to another exemplary embodiment.

FIG. 16 is a flowchart of a speech processing method of the user terminal 1200, according to another exemplary embodiment.

In operation 1610, the user terminal 1200 may generate the mapping table 1273 by mapping the ID to the personal information 1272. In this case, the user terminal 1200 may generate the mapping table 1273 by mapping IDs to the personal information 1272 and additional information generated from the personal information 1272. The additional information may include a phonetic symbol, a pronunciation, and the like. According to the present exemplary embodiment, the user terminal 1200 may generate a phonetic dictionary by using a word list of the personal information 1272 and map IDs to the phonetic symbol and the word by using the phonetic dictionary. In this case, the user terminal 1200 may assign arbitrary IDs. Details will be described with reference to FIGS. 18 to 20.

FIG. 18 is a diagram for describing the personal information 1272.

The personal information 1272 may be information capable of identifying each individual directly or indirectly and may include a contact, a music list, contents of short messages, incoming and outgoing history of the short messages, and a web browsing history, and a playback list. Various types of the personal information 1272 are illustrated in FIG. 18, and it can be seen from FIG. 18 that names stored in a contact item, a music list or singers stored in a music playlist, and a search result are stored in the personal information 1272. According to the present exemplary embodiment, the user terminal 1200 may generate the mapping table 1273 by mapping the IDs to the personal information 1272. A word mapping table 1910 will be described below with reference to FIG. 19.

FIG. 19 is a diagram for describing the word mapping table 1910 in which IDs are mapped to the personal information 1272.

Referring to FIG. 19, the user terminal 1200 may generate the word mapping table 1910 by mapping IDs "0x01", "0x02", "0x03", "0x04", "0x05", "0x06", and "0x07" to words "Hong Gil-dong", "Kim Gil-dong", "Gangnam style", "TOXIC", "Psy", "Galaxy", and "Note" included in the personal information 1272. Furthermore, the user terminal 1200 may generate the mapping table 1273 by mapping IDs to the additional information generated from the personal information 1272, in addition to the personal information 1272. The additional information may include a phonetic symbol, a pronunciation, and the like. A phonetic dictionary 2010 will be described below with reference to FIG. 20.

FIG. 20 is a diagram for describing the phonetic dictionary 2010 in which personal information 1272 is mapped to phonetic symbols.

According to the present exemplary embodiment, the user terminal 1200 may generate the phonetic dictionary 2010 by using a word list of the personal information 1272. Referring to FIG. 20, "Hong Gil-dong", the name stored in the contact included in the personal information 1272, may be represented by a phonetic symbol "HH OW NX K IY T OW NX". In addition, "Gangnam style" included in the music list may be represented by "K AA NX N A M ST AI L". The user terminal 1200 may generate the phonetic dictionary 2010 by representing the personal information 1272 by the phonetic symbols. In this case, the user terminal 1200 may use various types of phonetic symbols. As described above, the pronunciation may be represented by using alphabets. In the case of English words, the phonetic dictionary 2010 may be generated by using English phonetic symbols. Referring to FIG. 20, the personal information 1272 may be represented by English phonetic symbols. For example, "TOXIC" may be represented by "t a: k s ɪ k" and "Galaxy" may be represented by "g æ l ə k s i". The user terminal 1200 may generate the mapping table 1273 by mapping IDs to the additional information (e.g., phonetic symbols) generated from the personal information 1272, in addition to the personal information 1272.

Referring to FIG. 16 again, in operation 1620, the user terminal 1200 may generate the ID-based personalized model 1372 by using the mapping table 1273. Since the ID-based personalized model 1372 is generated by using the mapping table 1273 generated in operation 1610, the personal information 1272 and the additional information may be masked with the IDs. According to the present exemplary embodiment, the user terminal 1200 may represent the IDs mapped to the personal information 1272 and the additional information on the basis of acoustic unit IDs by generating the personalized model. An acoustic unit mapping table 2110 and personal information will be described below with reference to FIGS. 21 and 22.

FIG. 21 is a diagram for describing the acoustic unit mapping table 2110 in which acoustic units are mapped to IDs.

The acoustic unit IDs may represent specific portions of the SR model corresponding to phonetic symbols. Referring to FIG. 21, the user terminal 100 may generate the acoustic unit mapping table 2110 by mapping IDs "0x101", "0x102", "0x103", "0x104", "0x105", and "0x106" to phonetic symbols "HH", "OW", "NX", "K", "IY", and "L" included in the each word. According to the present exemplary embodiment, when the ID is mapped to acoustic, the user terminal 1200 may map a specific ID to specific acoustic according to prearrangement with the server 1300. That is, the ID "0x101", which is mapped to the acoustic unit "HH" by the user terminal 1200, may be an ID prearranged with the server 1300. Therefore, when the data processing is performed on the speech signal, the server 1300 may map a specific speech signal, that is, specific acoustic, to a specific ID prearranged with the user terminal 1200. The prearranging process of the user terminal 1200 and the server 1300 may be notified to the other party by either the user terminal 1200 or the server 1300 by designating an ID mapped to specific acoustic, or may an ID may be mapped to a phonetic symbol by exchanging opinions. In FIG. 20, for convenience, the phonetic symbol and the acoustic unit ID are mapped one to one, but the acoustic unit ID and the phonetic symbol may not be mapped one to one. For example, combined acoustic of the phonetic symbols "HH" and "OW" may be considered as one acoustic unit and one acoustic unit ID may be assigned to "HH OW".

FIG. 22 is a diagram for describing the personal information 2210 that is mapped to word IDs 2220 and acoustic unit IDs 2230.

The user terminal 1200 may map the personal information 2210 to the word IDs 2220 and may the acoustic unit IDs 2230 to the word IDs 2220 by using the phonetic symbols of the personal information 2210 and the acoustic model. The acoustic unit ID may represent a specific portion of an SR model corresponding to a phonetic symbol, and the acoustic unit ID and the phonetic symbol may not be mapped one to one. However, for convenience, it is assumed that the acoustic unit ID and the phonetic symbol are mapped one to one.

Referring to FIG. 22, the user terminal 1200 maps an arbitrary ID "0x01" to the word "Hong Gil-dong" in the personal information 2210. The word "Hong Gil-dong" may be represented by the phonetic symbols "HH OW NX K IY T OW NX", and the phonetic symbols may be mapped to the acoustic unit IDs 0x101, 0x102, 0x103, 0x104, 0x105, 0x106, etc., prearranged with the server 1300. Therefore, the ID "0x01" corresponding to "Hong Gil-dong" may be represented by the acoustic unit IDs 0x101, 0x102, 0x103, 0x104, 0x105, 0x106, etc.

According to the present exemplary embodiment, the user terminal 1200 may map an arbitrary word ID to a word and represent the corresponding word ID by an acoustic word ID prearranged with the server 1300. Since the personal information 1272 is masked with the ID, it is possible to protect the personal information 1272 even when the personalized model is exposed to the outside. In addition, the server 1300 may perform the data processing on the speech signal by using the prearranged acoustic unit ID.

In operation 1630, the user terminal 1200 may transmit the ID-based personalized model 1372 to the server 1300. As described above, the ID-based personalized model 1372 may be generated based on the word ID 2220 and the acoustic unit ID 2230 illustrated in FIG. 22. Therefore, when a speech signal to be recognized is received, the server 1300 may process the speech signal and output the word ID 2220 corresponding to the acoustic unit ID 2230 of the corresponding speech signal. At this time, since the mapping table 1273 is stored in only the user terminal 1200, without being transmitted to the server 1300, it is possible to protect the personal information 1272 even when the personalized model is exposed to the outside.

In operation 1640, the user terminal 1200 may receive, from the server 1300, the result of the data processing performed on the speech signal by using the ID-based personalized model 1372. For example, the result of the data processing performed in the server 1300 by using the ID-based personalized model 1372 may include the word IDs 2220 as illustrated in FIG. 22.

In operation 1650, the user terminal 1200 may restore the personal information 1272 or the additional information corresponding to the ID by using the mapping table 1273 and the result of the data processing received from the server 1300. That is, when the word ID 2220 as illustrated in FIG. 22 is received from the server 1300 as the result of the data processing, the user terminal 1200 may restore the personal information corresponding to the word ID 2220 by using the stored word mapping table 1273. Referring to FIG. 20, the user terminal 1200 may restore the ID "0x01" to "Hong Gil-dong". According to the present exemplary embodiment, the user terminal 1200 may complete the data processing by restoring the ID-masked personal information 1272 by using the mapping table 1273. The user terminal 1200 may enable the speech processing system to have a high performance by generating the personalized model 1372, and actual data processing is performed in the server 1300 having a high arithmetic capacity, thus processing the speech signal quickly.

Furthermore, the user terminal 1200 may output the result of the data processing to the user.

As a result, according to the present exemplary embodiment, the personal information 1272 is transmitted to the server 1300 after modifying the contents of the words or sentences into a non-understandable form. Thus, even when the personalized model is exposed to the outside, it is difficult to restore the ID-masked personal information 1272, thus protecting the personal information 1272. In addition, since the data processing is performed on the speech signal by transmitting the personalized model to the server having a high arithmetic capacity, it is possible to implement a speech processing system having a higher performance and a higher processing speed.

Figure 17:
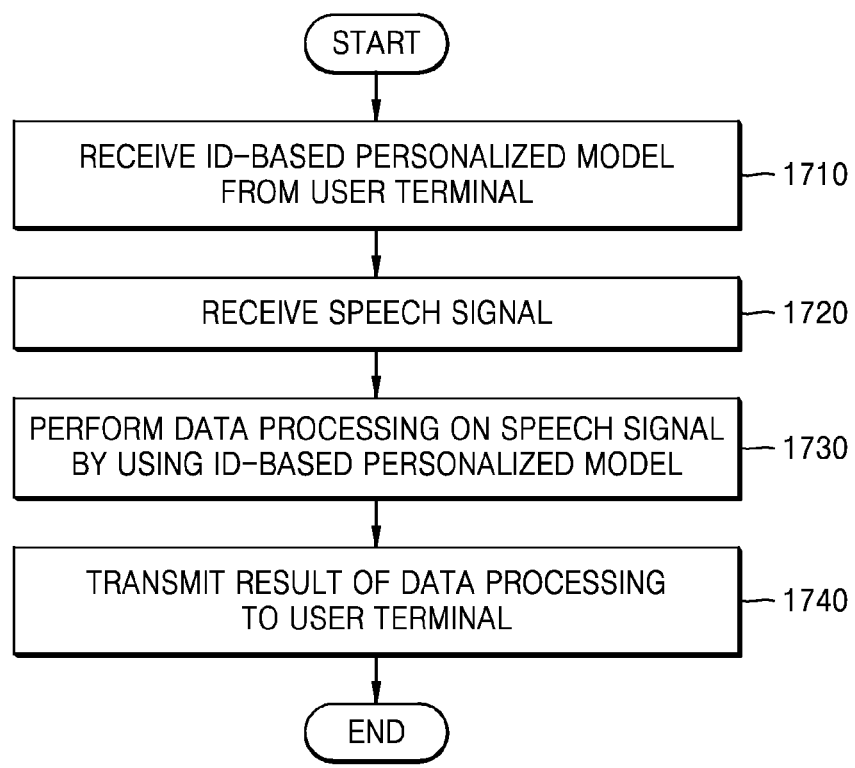
FIG. 17 is a flowchart of a speech signal processing method of a server, according to another exemplary embodiment.

FIG. 17 is a flowchart of a speech processing method of the server 200, according to another exemplary embodiment.

In operation 1710, the server 1300 may receive the ID-based personalized model 1273 from the user terminal 1200. Since the personal information 1272 is masked with the ID, it is difficult to restore the ID-masked personal information 1272 even when the ID-based personalized model 1273 is exposed to the outside, thus protecting the personal information 1272.

First, in operation 1720, the server 1300 may receive a speech signal. The server 1300 may receive a speech signal through various elements. It is common that the server 1300 receives the speech signal from the user terminal 100, but the server 1300 may also receive the speech signal through the USB interface or the DVD interface.

In operation 1730, the server 1300 may perform data processing on the received speech signal by using the ID-based personalized model 1273. In this case, the server 1300 may perform control such that the personal information ID is represented by using the ID mapped to the acoustic unit according to the prearrangement with the user terminal 1200. The acoustic unit mapping table 2110 and the personal information 2210 will be described below with reference to FIGS. 21 and 22.

Referring to FIG. 21, the server 1300 may map the ID to the acoustic unit according to the prearrangement with the user terminal 1200. The server 1300 may recognize the speech signal "Hong Gil-dong" as a set of continuous acoustics. Therefore, the speech signal "Hong Gil-dong" may be represented by the set of acoustic unit IDs "0x101, 0x102, 0x103, 0x104, 0x105, 0x106, etc." in such a manner that the ID "0x101" prearranged with the user terminal 1200 may be assigned to the acoustic "HH" and the ID "0x102" is assigned to the acoustic "OW".

The server 1300 may find the word ID corresponding to the set of phonetic symbol IDs in the personalized model 1273 received from the user terminal 1200 and map the found word ID. Referring to FIG. 22, the ID "0x01" is mapped to the word "Hong Gil-dong". Therefore, the server 1300 may represent the speech signal "Hong Gil-dong" by the word ID "0x01" corresponding to the set of phonetic symbol IDs "0x101, 0x102, 0x103, 0x104, 0x105, 0x106, etc". Since the server 1300 receives the personalized model 1372 from the user terminal 1200 and performs the data processing, the server 1300 may have a high performance. In addition, since the server 1300 has a high arithmetic capacity, it is possible to process the speech signal quickly.

In operation 1740, the server 1300 may transmit the result of the data processing to the user terminal 1200.

As a result, according to the present exemplary embodiment, the personal information 1272 is transmitted to the server 1300 after modifying the contents of the words or sentences into a non-understandable form. Thus, even when the personalized model is exposed to the outside, it is difficult to restore the ID-masked personal information 1272, thus protecting the personal information 1272. In addition, since the server 1300 having a high arithmetic capacity performs the data processing on the speech signal by using the personalized model, it is possible to implement a speech processing system having a higher performance and a higher processing speed.

Figure 23:
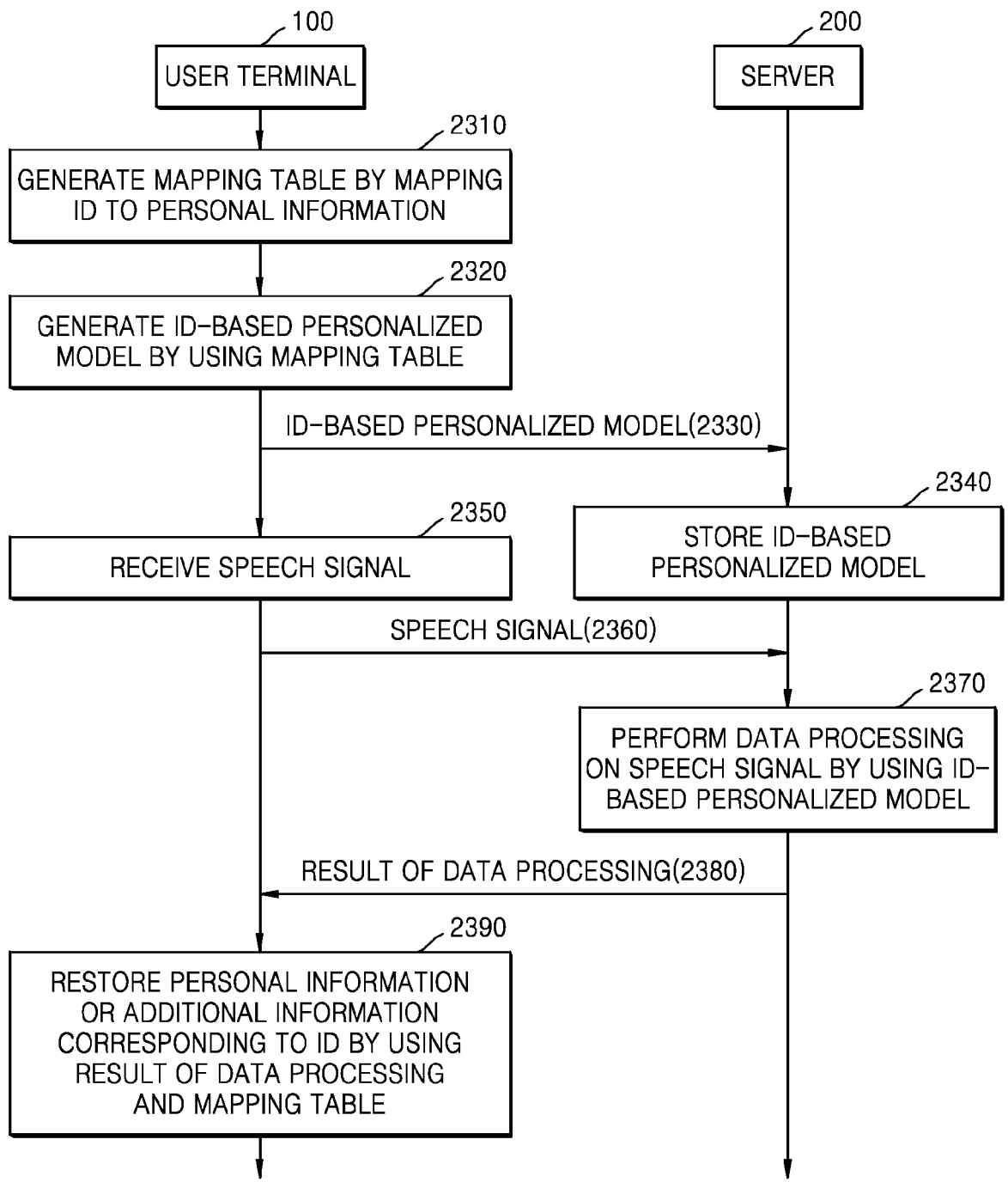
FIG. 23 is a flowchart of operation processes of a user terminal and a server, according to another exemplary embodiment.

FIG. 23 is a flowchart of operation processes of the user terminal 100 and the server 200, according to another exemplary embodiment.

In operation 2310, the user terminal 1200 may generate the mapping table 1273 by mapping the ID to the personal information 1272. The user terminal 1200 may generate a phonetic dictionary 2010 by using a word list of the personal information 1272 and map an IDs to a phonetic symbol and a word by using the phonetic dictionary 2010. In this case, the user terminal 1200 may assign arbitrary IDs.

In operations 2320 and 2330, the user terminal 1200 may generate an ID-based personalized model 1372 by using the mapping table 1273 and transmit the ID-based personalized model 1372 to the server. In operation 2340, the server 1300 may store the ID-based personalized model 1372 in the storage 1370. The ID-based personalized model 1372 may be generated based on the word ID 2220 and the acoustic unit ID 2230 illustrated in FIG. 22.

In operations 2350 and 2360, the user terminal 1200 may receive the speech signal and transmit the received speech signal to the server 1300. As described above, the user terminal 100 may receive the speech signal through various elements. It is common that the user terminal 1200 receives the speech signal through the microphone, but the user terminal 1200 may also receive the speech signal through the USB interface or the DVD interface. Furthermore, the user terminal 1200 may receive the speech signal through communication with an external device.

In operation 2370, the server 1300 may perform data processing on the received speech signal by using the ID-based personalized model 1372. In operation 2380, the server 1300 may transmit a result of the data processing to the user terminal 1200. In this case, the server 1300 may represent the ID mapped to the personal information 1272 or the additional information by using the ID mapped to the acoustic unit according to the prearrangement with the user terminal 1200.

In operation 2390, the user terminal 1200 may restore the personal information 1272 or the additional information corresponding to the ID by using the result of the data processing and the mapping table 1273.

According to the present exemplary embodiment, since the server 1300 receives the ID-based personalized model 1372 from the user terminal 1200 and performs the data processing by using the received ID-based personalized model 1372, it is difficult to restore the ID-masked personal information masked even when the personalized model is exposed to the outside, thus protecting the personal information. In addition, since the server 1300 having a high arithmetic capacity performs the data processing on the speech signal, it is possible to implement a speech processing system having a higher performance and a higher processing speed.

The above-described exemplary embodiments may be embodied as computer programs stored on a non-transitory computer-readable recording medium and may be implemented by general-purpose digital computers that execute the computer programs.

Examples of the computer-readable recording medium may include magnetic storage media (e.g., ROM, floppy disks, hard disks, etc.), optical readable media (e.g., CD-ROMs, or DVDs, etc.), and carrier waves (e.g., transmission via Internet, etc.).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A speech signal processing method of a user terminal, comprising:
   generating a mapping table by mapping an identification (ID) to personal information;
   generating an ID-based personalized model by using the mapping table, wherein the ID is an acoustic unit ID mapped to an acoustic unit, the acoustic unit ID represents a specific portion of a speech recognition (SR) model corresponding to a phonetic symbol or pronunciation, and the ID-based personalized model is the SR model;
   transmitting the ID-based personalized model to a server;
   receiving, from the server, a result of data processing performed on a speech signal by using the ID-based personalized model; and
   restoring the personal information corresponding to the acoustic unit ID by using a result of the data processing and the mapping table.

2. The speech signal processing method of claim 1, wherein the acoustic unit ID comprises an ID mapped to the phonetic symbol or the pronunciation according to prearrangement with the server.

3. The speech signal processing method of claim 1, further comprising generating the mapping table by mapping the acoustic unit ID to additional information generated from the personal information.

4. The speech signal processing method of claim 1, wherein generating the mapping table by mapping an ID to additional information generated from the personal information comprises:
   generating a phonetic dictionary by using a word list from the personal information; and
   mapping arbitrary IDs to at least one of the phonetic symbol and words in the word list by using the phonetic dictionary.

5. The speech signal processing method of claim 1, further comprising:
   obtaining the speech signal; and
   transmitting the obtained speech signal to the server.

6. A user terminal comprising:
   a communication unit configured to communicate with a server; and
   a control unit configured to:
   generate a mapping table by associating personal information with an ID,
   generate an ID-based personalized model by using the mapping table, wherein the ID is an acoustic unit ID mapped to an acoustic unit, the acoustic unit ID represents a specific portion of a speech recognition (SR) model corresponding to a phonetic symbol or pronunciation, and the ID-based personalized model is the SR model,
   control the communication unit to transmit the ID-based personalized model the server, and
   restore the personal information corresponding to the ID by using the mapping table and a result of data processing that is performed on a speech signal by using the ID-based personalized model and received from the server.

7. The user terminal of claim 6, wherein the control unit is configured to perform control such that the mapping table is generated by mapping the acoustic unit ID to additional information generated from the personal information.

8. The user terminal of claim 6, wherein the control unit is further configured to:
   generate a phonetic dictionary by using a word list from the personal information; and
   map arbitrary IDs to at least one of the phonetic symbol and words in the word list by using the phonetic dictionary.

9. The user terminal of claim 6, wherein the control unit is further configured to:
   obtain the speech signal; and
   transmit the obtained speech signal to the server.

10. The user terminal of claim 6, wherein the acoustic unit ID comprises an ID mapped to the phonetic symbol or the pronunciation according to prearrangement with the server.

11. A speech signal processing method of a server, comprising:
    receiving an ID-based personalized model from a user terminal;
    receiving a speech signal;
    performing data processing on the speech signal by using the ID-based personalized model, wherein the performing comprises representing an ID, wherein the ID is an acoustic unit ID mapped to an acoustic unit, the acoustic unit ID represents a specific portion of a speech recognition (SR) model corresponding to a phonetic symbol or pronunciation, and the ID-based personalized model is the SR model; and
    transmitting a result of the data processing to the user terminal.

12. The speech signal processing method of claim 11, wherein the performing of the data processing on the speech signal by using the ID-based personalized model, the acoustic unit ID is mapped to personal information.

13. The speech signal processing method of claim 12, wherein the acoustic unit ID is mapped to the phonetic symbol or the pronunciation according to a prearrangement with the server.

* * * * *